United States Patent
Tsuda et al.

(10) Patent No.: US 9,098,181 B2
(45) Date of Patent: Aug. 4, 2015

(54) INFORMATION PROCESSING APPARATUS

(75) Inventors: Munetaka Tsuda, Kyoto (JP); Shuji Hiramatsu, Tokyo (JP); Shigeru Enomoto, Kanagawa (JP); Motoki Kobayashi, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 669 days.

(21) Appl. No.: 13/080,837

(22) Filed: Apr. 6, 2011

(65) Prior Publication Data
US 2011/0250956 A1  Oct. 13, 2011

(30) Foreign Application Priority Data

Apr. 9, 2010  (JP) ................................. 2010-090995

(51) Int. Cl.
*G06F 3/033* (2013.01)
*G06F 3/0485* (2013.01)
*G06F 3/0482* (2013.01)
*G06F 3/0483* (2013.01)
*G06F 3/0488* (2013.01)

(52) U.S. Cl.
CPC ............ *G06F 3/0485* (2013.01); *G06F 3/0482* (2013.01); *G06F 3/0483* (2013.01); *G06F 3/0488* (2013.01)

(58) Field of Classification Search
USPC ........................................................ 715/863
See application file for complete search history.

(56) References Cited

U.S. PATENT DOCUMENTS

| | | |
|---|---|---|
| 6,184,882 B1 | 2/2001 | Coley et al. |
| 6,356,281 B1 | 3/2002 | Isenman |
| 6,940,488 B1* | 9/2005 | Siddiqui et al. ............... 345/163 |
| 7,158,151 B2 | 1/2007 | Asami |
| 8,266,550 B1* | 9/2012 | Cleron et al. ................. 715/863 |
| 2002/0186251 A1 | 12/2002 | Himmel et al. |
| 2003/0179189 A1 | 9/2003 | Lira |
| 2006/0038796 A1 | 2/2006 | Hinckley et al. |
| 2006/0041847 A1* | 2/2006 | Maw .............................. 715/793 |
| 2009/0064055 A1* | 3/2009 | Chaudhri et al. ............. 715/863 |

(Continued)

FOREIGN PATENT DOCUMENTS

| | | |
|---|---|---|
| JP | 2001-103389 | 4/2001 |
| JP | 2002-278669 | 9/2002 |
| JP | 2007-094814 | 4/2007 |

(Continued)

OTHER PUBLICATIONS

Japanese Office Action dated Apr. 27, 2012, from corresponding Japanese Application No. 2010-090995.

(Continued)

*Primary Examiner* — Kee M Tung
*Assistant Examiner* — Nicholas R Wilson
(74) *Attorney, Agent, or Firm* — Katten Muchin Rosenman LLP

(57) ABSTRACT

Provided is an information processing apparatus configured to: display on a screen a display target range, which is a part of a display region including display elements arranged therein; and move the display target range in the display region in accordance with a direction of a scroll instruction when the scroll instruction is received from a user in a state in which the display target range is displayed, in which a movement amount of the display target range in accordance with the scroll instruction is changed based on a position of the display target range in the display region.

6 Claims, 16 Drawing Sheets

(56) References Cited

U.S. PATENT DOCUMENTS

2009/0144661 A1 6/2009 Nakajima et al.
2010/0083165 A1* 4/2010 Andrews et al. .............. 715/784

FOREIGN PATENT DOCUMENTS

| JP | 2009-205675 | 9/2009 | | |
|---|---|---|---|---|
| JP | 2010-15239 | 1/2010 | | |
| WO | WO 2008030976 A2 * | 3/2008 | .............. | G06F 3/048 |

OTHER PUBLICATIONS

European Search Report dated May 10, 2012, from corresponding European Application No. 11 00 2986.
Australian Office Action dated May 23, 2012, from corresponding Australian Application No. 2011201514.
Australian Office Action dated Nov. 28, 2012, from corresponding Australian Application No. 2011201514.
Japanese Office Action date Feb. 19, 2013, from corresponding Japanese Application No. 2010-090995.
Toru Yamano. "Deji-mono paradise" Yomiuri PC, vol. 13, No. 1, Jan. 1, 2008.
United States Office Action dated Dec. 7, 2012, from corresponding U.S. Appl. No. 13,080/836.
User Guide, 2009, Motorola Droid, "http://web.archive.org/web/20091122110403/http://www.motorola.com/staticfiles/Support/US-EN/Mobile%20Phones/DROID-by-Motorola/US-EN/Documents/Static-Files/DROID_UG_Verizon_68000202474a.pdf".
United States Office Action dated Apr. 4, 2013, from corresponding U.S. Appl. No. 13/080,836.
Japanese Office Action date Nov. 19, 2013, from corresponding Japanese Application No. 2013-001436.
United States Office Action dated Aug. 27, 2013, from corresponding U.S. Appl. No. 13/080,836.
Verizon Wireless, "DROID by Motorola Emulator", Retrieved Aug. 19, 2013 from http://www.verizonwireless.com/multimedia/mim/emulators/mot_droid/emulator.html.

* cited by examiner

| PROGRAM ID | DISPLAY TERMINATION RESTRICTION FLAG |
|---|---|
| PROGRAM APb | No |
| PROGRAM APc | Yes |
| PROGRAM APa | No |
| Null | Null |
| Null | Null |
| Null | Null |
| Null | Null |

M

| PROGRAM ID | DISPLAY TERMINATION RESTRICTION FLAG |
|---|---|
| PROGRAM APg | No |
| PROGRAM APf | No |
| PROGRAM APh | Yes |
| PROGRAM APd | No |
| PROGRAM APb | No |
| PROGRAM APc | Yes |
| PROGRAM APa | No |

M

| PROGRAM ID | DISPLAY TERMINATION RESTRICTION FLAG |
|---|---|
| PROGRAM APe | No |
| PROGRAM APg | No |
| PROGRAM APf | No |
| PROGRAM APh | Yes |
| PROGRAM APd | No |
| PROGRAM APb | No |
| PROGRAM APc | Yes |

M

| PROGRAM ID | DISPLAY TERMINATION RESTRICTION FLAG |
|---|---|
| PROGRAM APa | No |
| PROGRAM APb | No |
| PROGRAM APc | Yes |
| Null | Null |
| Null | Null |
| Null | Null |
| Null | Null |

M

INFORMATION PROCESSING APPARATUS

BACKGROUND OF THE INVENTION

1. Field of the Invention

The present invention relates to an information processing apparatus that performs scroll control in accordance with a scroll instruction from a user, an information processing method, and an information storage medium.

2. Description of the Related Art

It is a conventional practice in an information processing apparatus such as a computer to generate a display region in which various kinds of display elements to be presented to a user are arranged, for example, a window or a tab, and display the display region on a screen. With such information processing apparatus, in a case where the display region has a size exceeding the screen, the information processing apparatus cannot display on the screen all the display elements such as text and images arranged in the display region at once. In this case, the user performs an input operation of specifying a direction to move (scroll) a range (display target range) of the display region that is displayed on the screen, and to thereby see each display element arranged in the display region.

SUMMARY OF THE INVENTION

It is an object of the present invention to provide an information processing apparatus capable of performing scroll control in a manner that is easy for a user to grasp display contents, an information processing method, and an information storage medium.

An information processing apparatus according to the present invention includes: means for displaying on a screen a display target range, which is a part of a display region including display elements arranged therein; and means for controlling a scroll to move the display target range in the display region in accordance with a direction of a scroll instruction when the scroll instruction is received from a user in a state in which the display target range is displayed, in which the means for controlling a scroll changes, based on a position of the display target range in the display region, a movement amount of the display target range in accordance with the scroll instruction.

In the information processing apparatus, the means for controlling a scroll may change the movement amount of the display target range in accordance with the scroll instruction for a case where a predetermined range in the display region is included in the display target range and for a case where the predetermined range is not included in the display target range.

Further, in the information processing apparatus, the predetermined range may include at least one unit region having a length along the direction of the scroll instruction corresponding to a length of the display target range along the direction of the scroll instruction, and the means for controlling a scroll may move, when the scroll instruction is a scroll instruction to include one unit region included in the predetermined range in the display target range, the display target range so as to include the one unit region entirely, and move, when the scroll instruction is not a scroll instruction to include any one of the at least one unit region in the display target range, the display target range by the movement amount corresponding to a specified amount of the scroll instruction.

Further, in the information processing apparatus, the means for controlling a scroll may move the display target range so as to include the one unit region entirely when the scroll instruction is a scroll instruction having a specified amount by which the one unit region is included at a predetermined ratio or more with respect to the entire display target range.

Further, the means for controlling a scroll may move the display target range by the movement amount corresponding to the specified amount of the scroll instruction during the reception of the scroll instruction from the user, and move the display target range so as to include the one unit region entirely when the specified amount of the scroll instruction at a time point when completion of the scroll instruction is received is a specified amount by which the one unit region is included at the predetermined ratio or more with respect to the entire display target range.

Further, the means for controlling a scroll may return the display target range to a position at which the one unit region is not included when the specified amount of the scroll instruction at the time point when the completion of the scroll instruction is received is a specified amount by which the one unit region is included at a ratio less than the predetermined ratio with respect to the entire display target range.

Alternatively, in the information processing apparatus, the display region may include a plurality of subregions, and, if the scroll instruction is a scroll instruction to include a border position of the plurality of subregions in the display target range, the means for controlling a scroll may move the display target range by the movement amount that is determined based on a relationship between the position of the display target range and the border position in a case where the display target range is moved by the specified amount of the scroll instruction.

Further, an information processing method according to the present invention includes: displaying on a screen a display target range, which is a part of a display region including display elements arranged therein; and controlling a scroll to move the display target range in the display region in accordance with a direction of a scroll instruction when the scroll instruction is received from a user in a state in which the display target range is displayed, in which the controlling a scroll comprises changing, based on a position of the display target range in the display region, a movement amount of the display target range in accordance with the scroll instruction.

Further, an information storage medium according to the present invention is a computer-readable information storage medium having a program stored therein, the program causing a computer to function as: means for displaying on a screen a display target range, which is a part of a display region including display elements arranged therein; and means for controlling a scroll to move the display target range in the display region in accordance with a direction of a scroll instruction when the scroll instruction is received from a user in a state in which the display target range is displayed, in which the means for controlling a scroll changes, based on a position of the display target range in the display region, a movement amount of the display target range in accordance with the scroll instruction.

DETAILED DESCRIPTION OF THE INVENTION

Hereinafter, an embodiment of the present invention is described in detail with reference to the accompanying drawings.

Figure 1:
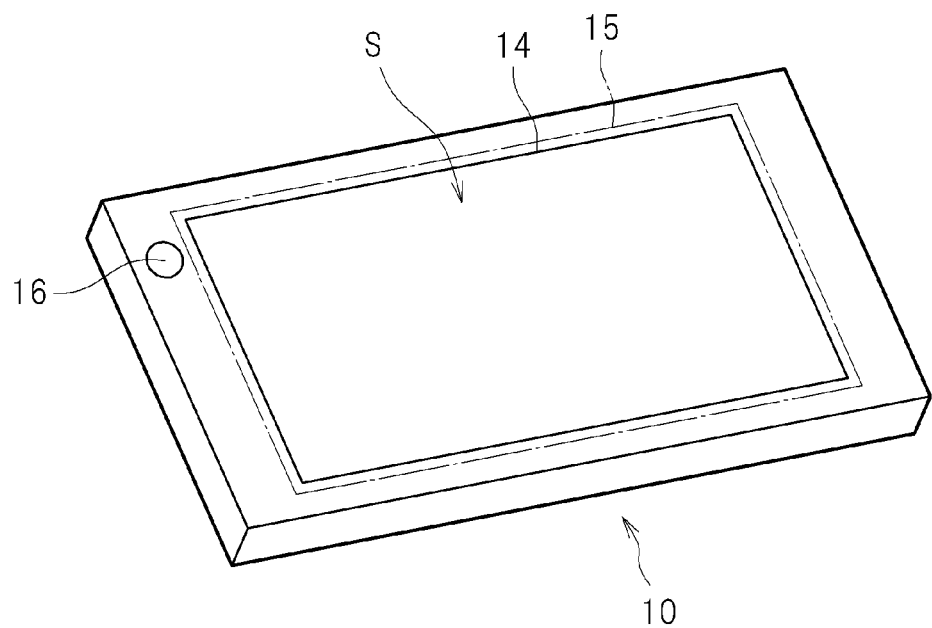
FIG. 1 is a perspective view illustrating an example of an appearance of an information processing apparatus according to an embodiment of the present invention.
Figure 2:
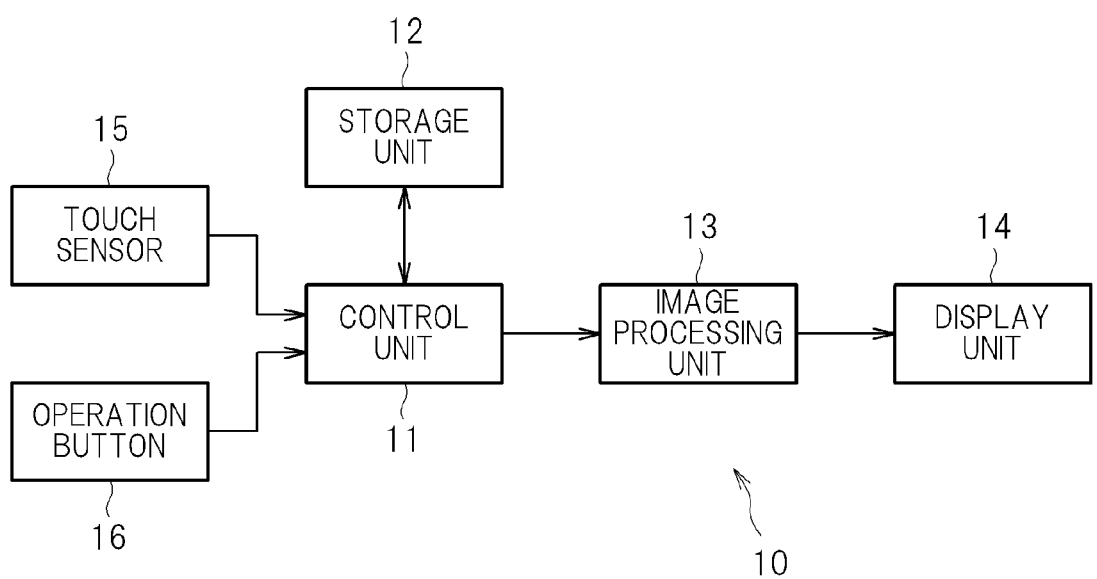
FIG. 2 is a configuration block diagram illustrating a configuration of the information processing apparatus according to the embodiment of the present invention.

FIG. 1 is a perspective view illustrating an example of an appearance of an information processing apparatus 10 according to an embodiment of the present invention. Further, FIG. 2 is a configuration block diagram illustrating a configuration of the information processing apparatus 10. As illustrated in the figures, the information processing apparatus 10 includes a control unit 11, a storage unit 12, an image processing unit 13, a display unit 14, a touch sensor 15, and an operation button 16.

The control unit 11 is, for example, a CPU or the like and executes various kinds of information processing in accordance with programs stored in the storage unit 12. A specific example of processing executed by the control unit 11 in this embodiment is described later.

The storage unit 12 is, for example, a memory element such as a random access memory (RAM) or a read-only memory (ROM), a disk device, or the like and stores the programs executed by the control unit 11 and various kinds of data. Further, the storage unit 12 also functions as a work memory for the control unit 11. Especially in this embodiment, the information processing apparatus 10 is intended to execute a plurality of application programs AP such as a game application, and the storage unit 12 stores the application programs AP.

The image processing unit 13 includes, for example, a GPU and a frame buffer memory, and renders an image to be displayed on a screen S of the display unit 14 in accordance with a rendering instruction output by the control unit 11. As a specific example, the image processing unit 13 includes a frame buffer memory corresponding to the screen S, and the GPU writes the image to the frame buffer memory every predetermined time in accordance with the instruction from the control unit 11. Then, the image written to the frame buffer memory is converted into a video signal at a predetermined timing, and displayed on the screen S.

Figure 3:
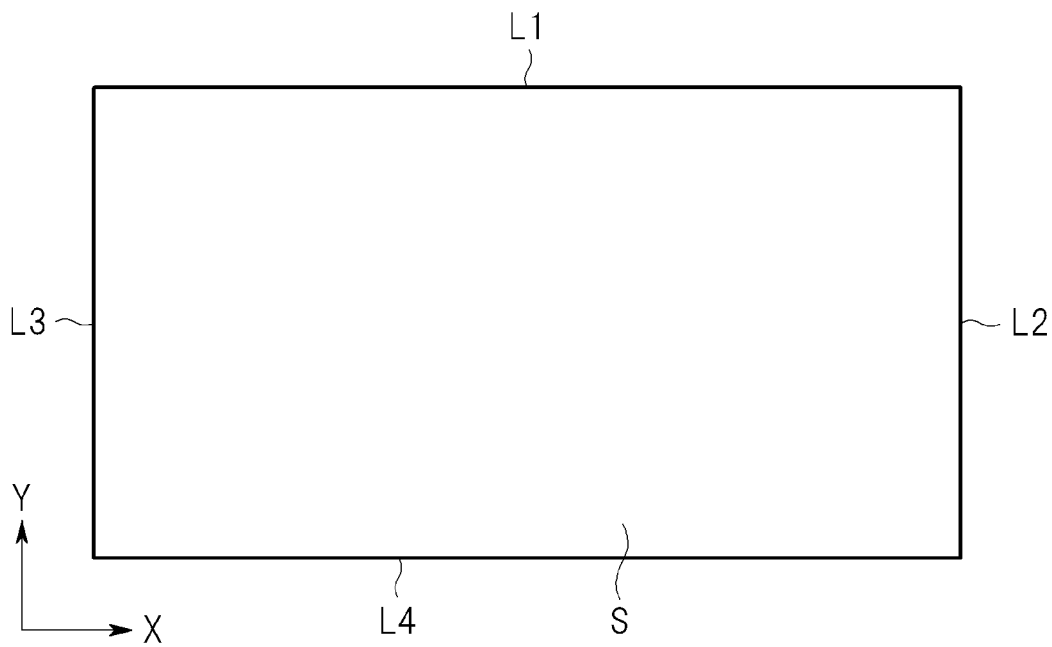
FIG. 3 illustrates a screen of the information processing apparatus according to the embodiment of the present invention.

The display unit 14 may be a variety of devices for displaying an image, such as a liquid crystal display panel and an organic electroluminescence (EL) display panel. The display unit 14 includes the screen S having a substantially rectangular shape as illustrated in FIG. 3. Hereinafter, peripheral sides of the screen S are referred to as an upper side L1, a right side L2, a left side L3, and a lower side L4. Further, the horizontal direction of the screen S (that is, the direction along the upper side L1 and the lower side L4) is referred to as an X-axis direction, and the direction toward the right side L2 is referred to as a positive X-axis direction. Further, the vertical direction of the screen S (that is, the direction along the right side L2 and the left side L3) is referred to as a Y-axis direction, and the direction toward the upper side L1 is referred to as a positive Y-axis direction.

The touch sensor 15 includes a substantially rectangular detection surface having a shape and size corresponding to the screen S and detects, when an object contacts on the detection surface, the contact position of the object. The detection surface of the touch sensor 15 is provided so as to overlap the screen S. Note that, in the following, for convenience of description, a user brings his/her finger into contact with the touch sensor 15 to input an operation. However, the present invention is not limited thereto, and the user may bring an object such as a stylus held in his/her hand into contact with the detection surface. Further, it is not necessary that the touch sensor 15 detect the position of the object only when the object contacts the detection surface, but the touch sensor 15 may detect the position of the object with respect to the detection surface when the object approaches to a detectable range on the detection surface. The touch sensor 15 may be of any type, as long as it is a device capable of detecting the position of the object on the detection surface, for example, of a capacitive type, a pressure type, an optical type, or the like.

The operation button 16 is a type of operation members used by the user in conjunction with the touch sensor 15 to input an operation to the information processing apparatus 10. The user pushes the operation button 16 to input the operation to the information processing apparatus 10. Note that, in FIG. 1, only one operation button 16 is illustrated, but the information processing apparatus 10 may include a plurality of operation buttons. The information processing apparatus 10 may further include a switch, an analog stick, or other such operation member.

In this embodiment, in order to receive an instruction operation from the user, the control unit 11 displays various images such as a menu image and images relating to the application programs AP on the screen S. Then, the control unit 11 executes various types of information processing using the detection result of the touch sensor 15 obtained in the state in which the images are displayed. Specifically, the control unit 11 uses the result of detecting the position of the finger of the user by the touch sensor 15 to judge details of the operation input by the user. Then, the control unit 11 executes the processing corresponding to the details of the judged operation input, and displays the processing result on the screen S to present the processing result to the user.

Next, the application programs AP stored in the storage unit 12 to be executed by the information processing apparatus 10 are described. Note that, in the following, an application program AP is a program to be activated in response to a selection made by the user in a state in which a menu image Im or a board image Ib to be described later is displayed. The information processing apparatus 10 may execute various programs in addition to the application programs AP.

In this embodiment, the application programs AP are classified into two types: full mode programs AP1 that are operated only in a full mode; and light programs AP2 that may be operated in a mode other than the full mode. Here, the full mode refers to a mode in which one program occupies the entire screen S for operation. The full mode programs AP1 are operated in the state of the full mode during its execution, and display the processing result on the entire screen S. In contrast, the light programs AP2 display their processing results in the board image Ib to be described later.

The storage unit 12 also stores, in association with each of the application programs AP, menu item image Ic representing the application program AP and a background image Iw (wallpaper image). Further, the storage unit 12 stores, in association with each of the full mode programs AP1, program-related images relating to the program. The program-related images include an activation image to be subjected to an operation performed by the user to activate the program. In this embodiment, the activation image is an activation button image IL representing an activation button.

Figure 4:
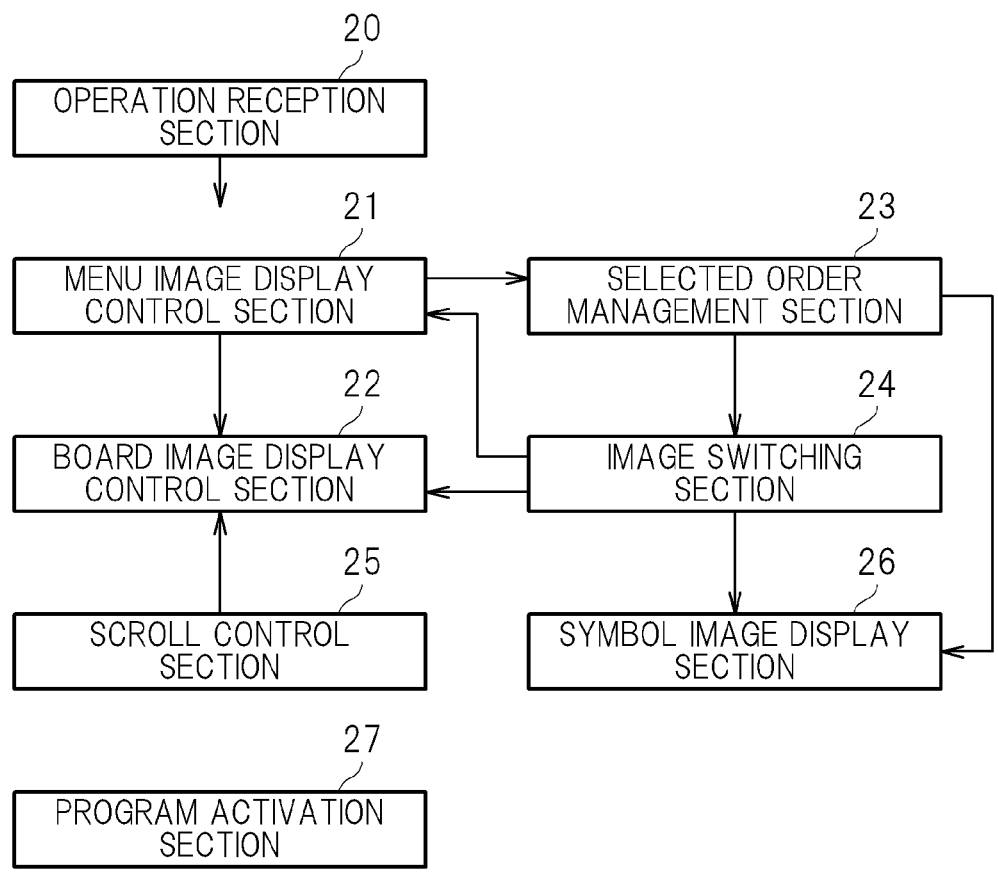
FIG. 4 is a function block diagram illustrating functions realized by the information processing apparatus according to the embodiment of the present invention.

Next, functions realized by the information processing apparatus 10 according to this embodiment are described. FIG. 4 is a function block diagram illustrating the functions realized by the information processing apparatus 10. As illustrated in the figure, the information processing apparatus 10 functionally includes an operation reception section 20, a menu image display control section 21, a board image display control section 22, a selected order management section 23, an image switching section 24, a scroll control section 25, a symbol image display section 26, and a program activation section 27. These functions are each realized by executing a program stored in the storage unit 12 by the control unit 11. The program may be, for example, stored in various types of computer-readable information storage media such as an optical disc to be provided to the information processing apparatus 10. Alternatively, the program may be provided to the information processing apparatus 10 through a communication network such as the Internet.

The operation reception section 20 receives the instruction operation performed by the user on the touch sensor 15 or the operation button 16. Especially in this embodiment, for example, the user brings his/her finger on the detection surface of the touch sensor 15 or slides the finger in a state in which the finger is in contact with the detection surface, to thereby input the operation to the information processing apparatus 10. Specifically, in the following, an operation in which the user brings his/her finger in contact with one point on the detection surface for a short period of time is referred to as a tap operation. When the tap operation is performed, the operation reception section 20 outputs a position of the tap operation (that is, the position in the detection surface with which the user brings his/her finger into contact). Further, an operation in which the user brings his/her finger into contact with one point on the detection surface and moves the finger linearly with the position as a start point in any direction on the detection surface before releasing the finger is referred to as a slide operation. When the slide operation is performed, the information processing apparatus 10 performs various kinds of information processing in accordance with the direction in which the user moved the finger in the operation. In other words, the slide operation is an operation for specifying a direction on the information processing apparatus 10. When the slide operation is performed in the state in which the menu image Im or the board image Ib to be described later is displayed, the operation reception section 20 determines the direction specified by the user from the positions of the start point and the end point. In this case, the specified direction may be, for example, any one of four directions in the screen S: up; down; left; and right. Alternatively, the operation reception section 20 may judge, when the slide operation is performed with positions or a position inside a predetermined region as the start point and/or the endpoint in a state in which a predetermined image is displayed, whether or not the direction of the slide operation is in a predetermined range from the positions of the start point and the end point of the slide operation. The function sections to be described below execute various types of information processing in accordance with the details of the tap operation and the slide operation received by the operation reception section 20.

The menu image display control section 21 displays the menu image Im on the screen S at a predetermined timing, for example, at the time of activation of the information processing apparatus 10, or at the time when the user gives an instruction to display a menu. The menu image Im is an image to be presented to prompt the user to select from the menu, the image representing a plurality of menu item images Ic as targets for selection by the user. Specifically, in this embodiment, the menu image Im is an image for prompting the user to select one of the application programs AP, and each of the menu item images Ic is stored in the storage unit 12 in association with any one of the application programs AP as described above. Note that, each of the menu item images Ic may be an icon image representing the corresponding application program AP. Further, in this embodiment, the menu item images Ic are stored in advance in the storage unit 12. However, the menu image display control section 21 may generate, based on, for example, a character string indicating a program name of each of the application programs AP, a menu item image Ic corresponding to the application program AP.

Figure 5:
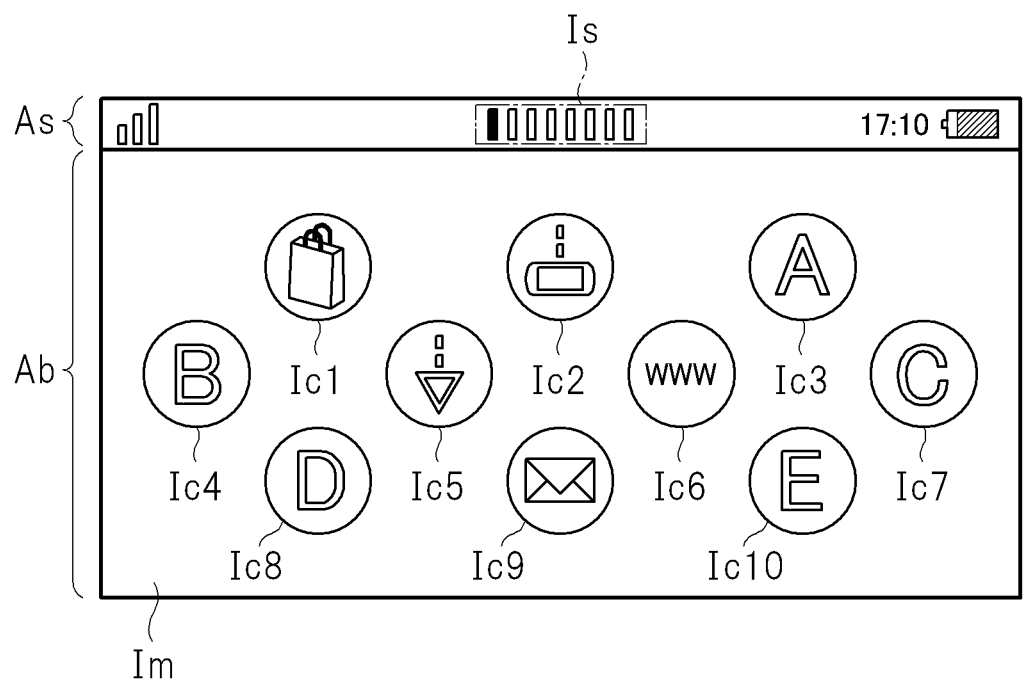
FIG. 5 is a diagram illustrating an example of a screen displaying a menu image.

FIG. 5 is a diagram illustrating an example of the screen S displaying the menu image Im. In this figure, the menu image Im includes 10 menu item images Ic1 to Ic10 respectively associated with the application programs AP. Further, in FIG. 5, a long rectangular status bar display region As is provided along the upper side L1 of the screen S, and the status bar display region As displays a status bar. In the status bar, symbol images Is to be described later are displayed, and in addition, there may be displayed various kinds of information indicating states of the information processing apparatus 10 including, for example, the remaining battery and the communication connectivity, the current time, and the like. Further, a region in the screen S that displays the menu image Im is referred to as a board display region Ab. In the example of FIG. 5, the board display region Ab is illustrated as a region of the screen S other than the status bar display region As. However, in a case where the status bar does not need to be displayed at all times, the board display region Ab may be the entire screen S.

In a state in which the menu image Im is displayed, the user taps a position at which any one of the menu item images Ic is displayed to perform a selection operation on the menu. In other words, the user selects any one of the menu item images Ic to give an instruction to display an image relating to the application program AP associated with the selected menu item image Ic. When a tap operation is received from the user, the menu image display control section 21 identifies the menu item image Ic displayed at the position in the screen S tapped by the user. Then, the menu image display control section 21 outputs information identifying the application program AP associated with the menu item image Ic (here, a program ID of the application programs AP) to the board image display control section 22 and the selected order management section 23.

Note that, in the example of FIG. 5, the menu image Im is an image of a size that fits in the board display region Ab of the screen S, but the menu image Im may have a size that exceeds the board display region Ab. In this case, the user gives a scroll instruction to be described later to scroll the menu image Im displayed in the board display region Ab until a portion including the menu item image Ic of the menu image Im that the user wants is displayed in the board display region Ab. Then, the selection operation is performed on the displayed menu item images Ic. Further, details of the menu image Im may be customized by the user. Specifically, the information processing apparatus 10 may, in response to the user's instruction, for example, add/delete the menu item images Ic to be displayed in the menu image Im, or change arrangement positions of the menu item images Ic in the menu image Im.

The board image display control section 22 displays, when any one of the menu item images Ic included in the menu image Im is selected by the user in the state in which the menu image display control section 21 displays the menu image Im on the screen S, image (selection target image) relating to the selected menu item image Ic on the screen S. Especially in this embodiment, the board image display control section 22 acquires the image relating to the application programs AP associated with the menu item image Ic selected by the user as the selection target image, and displays the image on the screen S. Specifically, when a program ID of the application program AP selected by the user is received from the menu image display control section 21, the board image display control section 22 reads program-related images relating to the application program AP from the storage unit 12, or receives information relating to the application programs AP through a communication network. Note that, the board image display control section 22 may also acquire the program-related images including the activation button image IL through a communication network from an external server. Then, the board image display control section 22 generates the selection target image including the above-mentioned information relating to the application programs AP. The selection target image is image showing the inside of a program board B. The program board B is a virtual region in which a plurality of display elements relating to the selected application program AP are arranged. Further, in the following, the selection target image showing the inside of the program board B is referred to as a board image Ib. The board image Ib is displayed in the same region as the board display region Ab in which the menu image display control section 21 displays the menu image Im.

The program board B may be a region of a size that fits in the board display region Ab. However, in the following, the program board B is a rectangular region extending along a predetermined scroll direction (here, Y-axis direction), and sides thereof extending along the Y-axis direction are longer than a side of the board display region Ab in the same direction. Therefore, the board image display control section 22 cannot display the entire program board B in the board display region Ab at once, but displays only a partial range of the program board B as the board image Ib in the board display region Ab. Here, the range of the program board B that is actually displayed on the screen S (hereinafter, referred to as display target range R) moves through the program board B along the predetermined scroll direction (Y-axis direction) under control of the scroll control section 25 to be described later. The board image Ib is an image showing the inside of the display target range R, which moves under control of the scroll control section 25, of the program board B. Note that, the size and the shape of the display target range R correspond to the size and shape of the board display region Ab. Specifically, in this embodiment, the display target range R has a rectangular shape, and the side thereof along the Y-axis direction has a length that is identical with the length of the sides of the board display region Ab along the Y-axis direction. On the other hand, sides of the display target range R along the X-axis direction have a length that is shorter than the length of the sides of the board display region Ab along the X-axis direction by lengths of two representational images In1 and In2 to be described later. Note that, the display target range R is positioned at a predetermined position, for example, the top end of the program board B, when the board image display control section 22 first displays the board image Ib.

Figure 6:
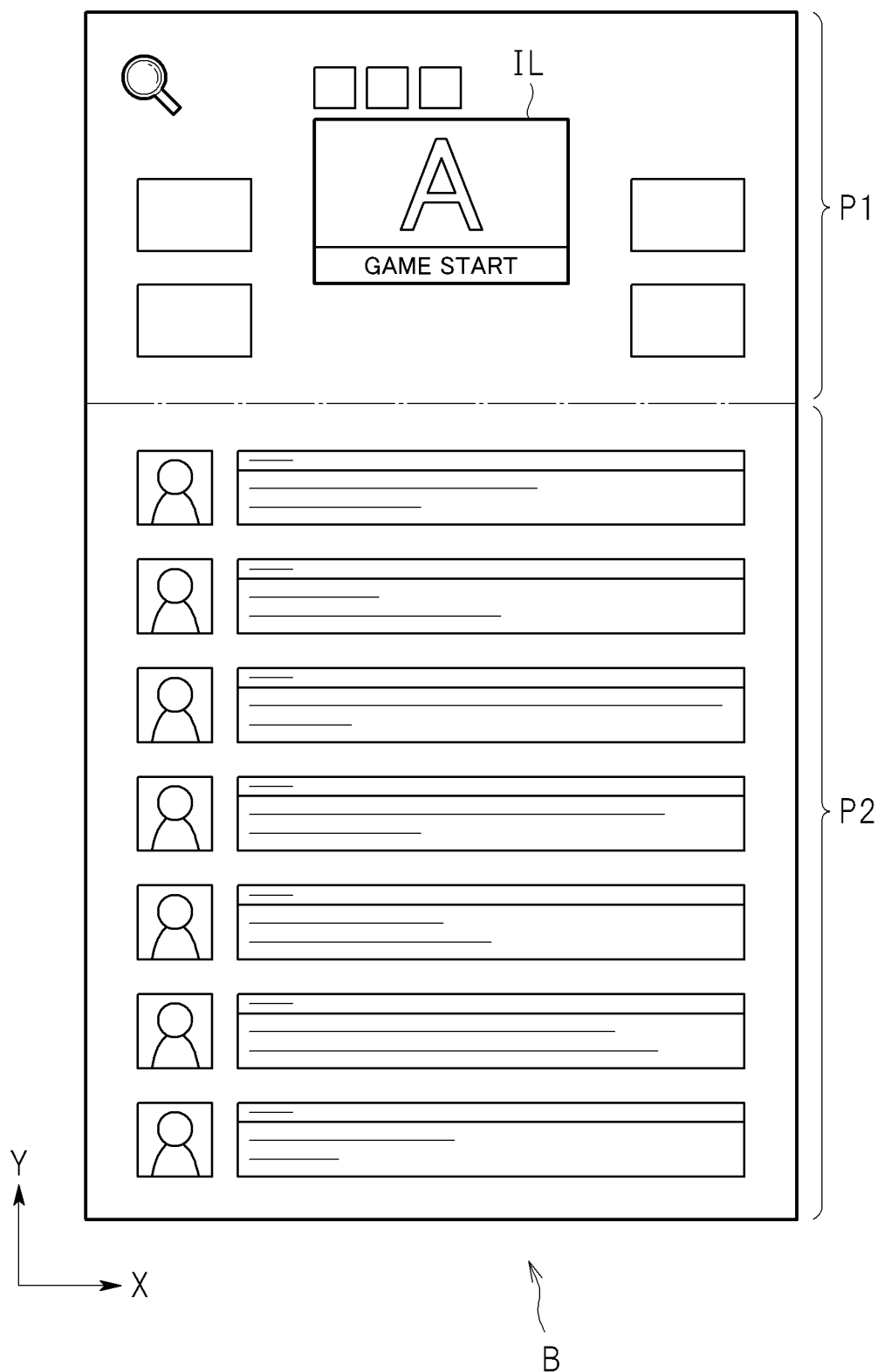
FIG. 6 is a diagram illustrating an example of a program board.

FIG. 6 is a diagram illustrating an example of the program board B corresponding to the full mode program AP1 of the application programs AP. As illustrated in this figure, in this embodiment, the program board B may include a plurality of subregions in each of which display elements representing different kinds of information are arranged. In FIG. 6, the program board B includes two subregions: a program information region P1; and a communication region P2. The program information region P1 is a region in which information prepared by the provider of the application program AP is presented, and has a size corresponding to the size of the display target range R. Further, the communication region P2 is a region used by users to exchange information or the like.

Specifically, in the program information region P1, a program-related image stored in the storage unit 12 as the display elements is arranged. Especially in the example of FIG. 6, the program information region P1 includes, at the center, the activation button image IL on which the operation of activating the application program AP is performed. The program information region P1 also includes various kinds of related information relating to the application programs AP around the activation button image IL, the related information being prepared by the provider of the program. The related information may be stored in advance in the storage unit 12 as the program-related image together with the application program AP and the activation button image IL, or may be information provided dynamically to the information processing apparatus 10 through a communication network such as the Internet. In the latter case, the storage unit 12 stores in advance information (for example, URL or the like) indicating the provider of the related information to be included in the program information region P1 in association with the program. The board image display control section 22 uses the information indicating the provider of the related information to access a content distribution server prepared by the provider of the application program AP or the like through the communication network and acquire the related information provided by the content distribution server. Then, the board image display control section 22 generates an image of the program information region P1 including the display elements indicating the details of the acquired related information and the activation button image IL stored in the storage unit 12 as a part of the program board B. This allows the provider of the application program AP to update the related information stored in the content distribution server as needed, to thereby distribute the up-to-date related information on the application program AP to the information processing apparatus 10 and present such related information when the user attempts to activate the application program AP.

Note that, the program information region P1 may include not only information unique to the application program AP corresponding to the program board B but also display elements having common details with program boards B of the other application programs AP.

The communication region P2 is a region for presenting details of messages regarding the application program AP posted by a plurality of users. Specifically, for example, the user of the information processing apparatus 10 may post a message regarding the application program AP to a predetermined communication server through a communication network such as the Internet. In order to realize such posting processing, the information processing apparatus 10 stores information (such as URL) for identifying the communication server to which the messages are posted in the storage unit 12 in association with the application program AP, and refers to the information to transmit the message input by the user to the communication server. Further, the board image display control section 22 accesses the communication server in generating the program board B associated with the application program AP to acquire message information posted previously regarding the application program AP. Then, the board image display control section 22 generates an image of the communication region P2, in which display elements representing the acquired details and senders of the messages are arranged, as a part of the program board B.

Figure 7:
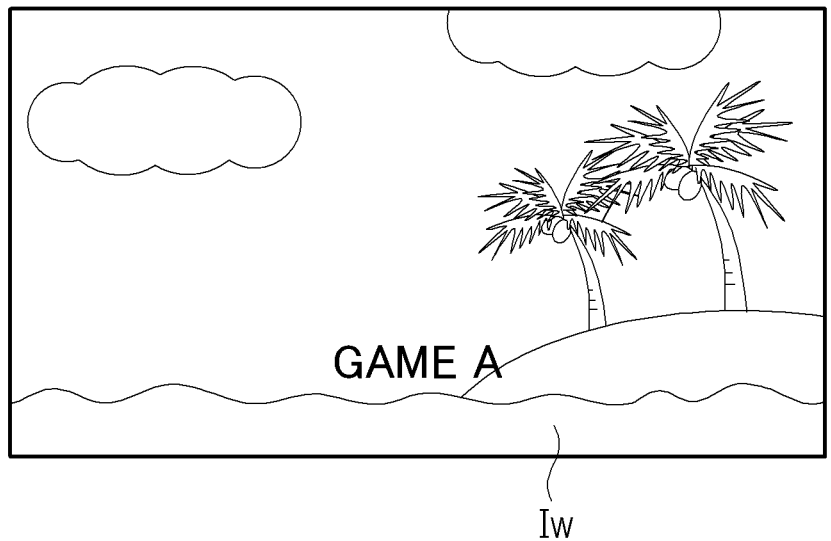
FIG. 7 is a diagram illustrating an example of a background image.
Figure 8:
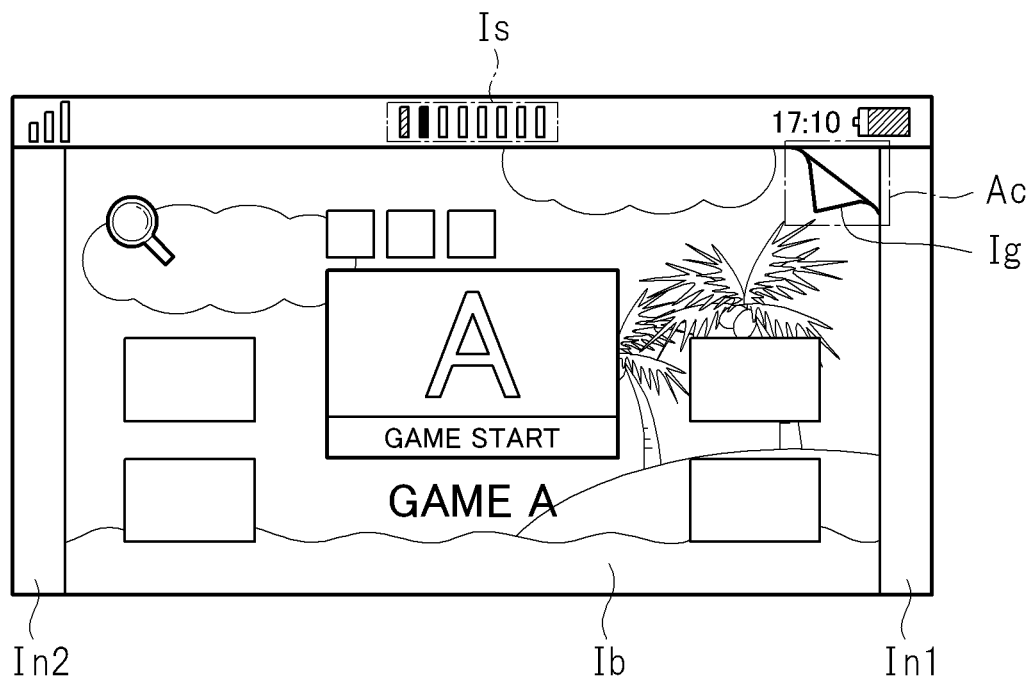
FIG. 8 is a diagram illustrating an example of a screen displaying a board image.

FIG. 8 is a diagram illustrating an example of the screen S displaying the board image Ib, and illustrates an example of the board image Ib in a case where the display target range R is set at a position overlapping the program information region P1 of the program board B illustrated in FIG. 6. In the example of the figure, the board image Ib is generated by superimposing display elements in the program board B on a predetermined background image Iw. FIG. 7 is a diagram illustrating an example of the background image Iw. Here, as described above, the background image Iw is stored in advance in the storage unit 12 in association with each of the plurality of application programs AP. In generating the board image Ib showing the inside of the program board B relating to each application program AP, the background image Iw associated with the application program AP is used.

Further, in the state in which the board image Ib is displayed on the screen S, an operation position guide image Ig is displayed in a predetermined region in the screen S (hereinafter, referred to as operation target region Ac) on which the user performs a display termination operation and a display termination restriction operation to be described later. The operation position guide image Ig is an image for guiding the user to a position of the operation target region Ac in the screen S, and is displayed at a position corresponding to the operation target region Ac. Note that, it is not necessary that the position at which the operation position guide image Ig is displayed perfectly coincide with the operation target region Ac itself. In the example of FIG. 8, the operation target region Ac is set at the upper right corner of the board display region Ab, and the operation position guide image Ig is an image showing a state in which a part of the background image Iw is turned back at the position.

In the state in which the board image Ib is displayed on the screen S, the user may perform an image switching operation to switch the board image Ib to be displayed. Further, the user may perform a scroll operation to move the display target range R set in the program board B, with the result that the contents to be displayed as the board image Ib may be scrolled. Those operations are described in detail below.

Further, in the state in which the board image Ib corresponding to the full mode program AP1 is displayed on the screen S, the user may perform an operation to give an instruction to activate the full mode program AP1. Specifically, in the state in which the board image Ib including the activation button image IL is displayed on the screen S, the user taps the display position of the activation button image IL to give the instruction to activate the corresponding full mode program AP1. When the activation instruction is received, the program activation section 27 activates the full mode program AP1 in the full mode. This causes an image of the processing result generated by the program to be displayed on the entire screen S. In this state, when the user gives an instruction to end the full mode through an operation of pressing the operation button 16 or other such methods, the board image display control section 22 redisplays the board image Ib, which was displayed immediately before the activation of the full mode program AP1. At this time, the information processing apparatus 10 does not necessarily end the full mode program AP1 that has been executed, but may redisplay the board image Ib in a state in which the execution of the program is temporarily stopped. This allows the information processing apparatus 10 to, when the user gives an instruction to reactivate the full mode program AP1 by tapping the activation button image IL again or other such methods, restart the execution of the program that has been temporarily stopped.

As described above, in a case where the menu item image Ic corresponding to the full mode program AP1 is selected, the information processing apparatus 10 displays the board image Ib including the activation button image IL first instead of activating the program immediately, to thereby present various types of information on the program to the user. Further, as described below, in the state in which the board image Ib is displayed, the user may perform an image switching operation to give an instruction to switch the board image Ib that has been displayed. However, there may be a case where the program operating in the full mode receives such operation corresponding to the image switching operation as another operation relating to the processing of the program. Therefore, the information processing apparatus 10 displays, in the case where the menu item image Ic corresponding to the full mode program AP1 is selected, the board image Ib first, to thereby also include the full mode program AP1, which occupies the entire screen during execution of the processing, as an image in the images as the targets for switching by the image switching operation.

Note that, in a case where the application program AP corresponding to the menu item image Ic selected by the user in the state in which the menu image Im is displayed is not the full mode program AP1 but the light program AP2, the program activation section 27 may activate the light program AP2 immediately. In this case, the board image display control section 22 generates, instead of the program board B including the activation button image IL as described above, the program board B including the processing result of the light program AP2, and displays a part of the program board B as the board image Ib in the board display region Ab. As in the case of the full mode program AP1, the program board B generated in this case may be a rectangular region having a horizontal width (length of the sides along the X-axis direction) that corresponds to a horizontal width of the board display region Ab and extending in the Y-axis direction. In particular, also for the program board B in which the processing result of the light program AP2 is displayed, the horizontal width is set so as not to exceed the horizontal width of the display target range R, which eliminates the need to perform scroll control by which the display target range R is moved in the horizontal direction (X-axis direction) to see the entire program board B. Therefore, the slide operation in the X-axis direction may be received not as the scroll operation but as the image switching operation to be described later.

The selected order management section 23 manages a selected order of the menu item images Ic selected previously by the user. Specifically, the selected order management section 23 receives the program ID output by the menu image display control section 21 when the user selects a menu item image Ic, and sequentially stores the received program IDs in a storage region (hereinafter, referred to as selected order storage region M) provided in the storage unit 12. This way, the program IDs identifying the application programs AP selected previously by the user are stored in the storage unit 12 in the order selected by the user. Note that, the selected order management section 23 limits the program IDs to be stored in the selected order storage region M to a predetermined number (hereinafter, referred to as upper limit N) that has been set in advance. Specifically, in this embodiment, the selected order management section 23 adds the program ID to the selected order storage region M in a first-in first-out manner. That is, when the user newly selects another menu item image Ic in a state in which the user has already selected the menu item images Ic up to the number that coincides with the upper limit N and the board images Ib corresponding to the N menu item images Ic have been displayed, the selected order management section 23 adds the program ID of the application program AP corresponding to the newly selected menu item image Ic to the selected order storage region M and, of the program IDs stored in the selected order storage region M, deletes the program ID stored least recently in the selected order storage region M. Note that, in this embodiment, the upper limit N is 7.

Figure 9A:
FIG. 9A is a diagram illustrating an example of data contents stored in a selected order storage region.
Figure 9B:
FIG. 9B is a diagram illustrating another example of the data contents stored in the selected order storage region.
Figure 9C:
FIG. 9C is a diagram illustrating still another example of the data contents stored in the selected order storage region.

FIGS. 9A to 9C are diagrams illustrating examples of data contents stored in the selected order storage region M. FIG. 9A indicates that three application programs AP: a program APa; a program APc; and a program APb have already been selected by the user in this order. Then, when the user selects a program APd, a program APh, a program APf, and a program APg in this order, the data contents stored in the selected order storage region M are as illustrated in FIG. 9B. Thereafter, when the user selects a program APe in the state in which the menu image Im is displayed, of the N program IDs stored in the selected order storage region M, the program ID of the program APa stored least recently in the selected order storage region M is deleted from the selected order storage region M, and the program ID of the program APe is added to the selected order storage region M. This results in the data contents in the selected order storage region M illustrated in FIG. 9C.

Here, the program IDs stored in the selected order storage region M are used to determine the board images Ib as the targets for switching by the image switching section 24 to be described later. Specifically, the board images Ib corresponding to the program IDs stored in the selected order storage region M are the targets for switching by the image switching section 24, and the board image Ib corresponding to the program ID deleted from the selected order storage region M is excluded from the targets for switching by the image switching section 24. Therefore, when a selection for a new menu item image Ic is received in the state in which the same number of the program IDs as the upper limit N are already stored in the selected order storage region M, the menu image display control section 21 may output a message warning that the selection of the new menu item image Ic excludes a board image Ib from the targets for switching by, for example, displaying the message on the screen S. Further, in this case, when the user gives a response to the message to permit the exclusion of the board image Ib from the switching targets, the selected order management section 23 may be configured to delete the program ID from the selected order storage region M and display the board image Ib corresponding to the newly selected menu item image Ic. Otherwise, the selected order management section 23 may be configured not to delete the program ID from the selected order storage region M. In this case, the program ID corresponding to the newly selected menu item image Ic is not added to the selected order storage region M.

Note that, in this example, the program ID to be deleted when the new menu item image Ic is selected is the program ID stored least recently in the selected order storage region M. However, the program ID to be deleted may be determined by another method. Specifically, the selected order management section 23 stores the timing at which each of the board images, which are the targets for switching by the image switching section 24, was displayed most recently. That is, when display of one board image Ib is terminated once as a result of the image switching by the image switching section 24, the selected order management section 23 stores timing information indicating the timing in association with the board image Ib. Thereafter, when a selection for a new menu item image Ic is received in the state in which the same number of program IDs as the upper limit N are already stored in the selected order storage region M, the selected order management section 23 refers to the timing information that has been stored to determine the board image Ib having the oldest timing at which the board image Ib was displayed most recently on the screen S, and deletes the program ID corresponding to the determined board image Ib. Note that, in this case, when a board image Ib is displayed once on the screen S for a display time period less than a predetermined time period, the selected order management section 23 may be configured not to update the above-mentioned timing information. This is because, when the display time period is excessively short, it is possible that the user merely caused the board image Ib to be displayed on the screen S in the course of the image switching with no intention to browse the board image Ib. Note that, also in the case of determining the program ID to be deleted as described above, the warning message as described above may be output before actually deleting the program ID, and the program ID may be deleted when the user gives the response for permission to the message.

The selected order management section 23 also manages, of the plurality of program IDs stored in the selected order storage region M, pointer information indicating which program ID identifies the application program AP for which the board image Ib is currently being displayed on the screen S. When a new menu item image Ic is selected by the user and accordingly the corresponding program ID is added to the selected order storage region M, the selected order management section 23 updates the pointer information so as to point to the newly added program ID. Further, when the image to be displayed on the screen S is switched by the image switching section 24 to be described later, the selected order management section 23 updates the pointer information in accordance with the switching.

Note that, when the user performs a predetermined display termination operation, the board image display control section 22 terminates display of the board image Ib that is currently being displayed. In this case, the selected order management section 23 deletes the program ID corresponding to the board image Ib that is the target of the display termination processing from the selected order storage region M. Further, when the user performs a predetermined display termination restriction operation, the board image display control section 22 shifts the board image Ib that is currently being displayed to a restriction state in which the board image Ib does not become the target for the above-mentioned termination processing. As illustrated in FIGS. 9A to 9C, the selected order storage region M stores, in association with each program ID, a flag (display termination restriction flag) indicating whether the board image Ib corresponding to the program ID is in the display termination restriction state. When the user performs the display termination restriction operation, the selected order management section 23 updates the display termination restriction flag associated with the program ID corresponding to the board image Ib that is currently being displayed to a value indicating that the display termination is restricted. The display termination processing and the display termination restriction processing for the board image Ib are described in detail below.

With the board images Ib already displayed by the board image display control section 22 being the switching targets, the image switching section 24 redisplays an image selected from the board images Ib as the switching targets in response to the user's instruction in the board display region Ab of the screen S. Specifically, when the user performs a predetermined image switching operation, the image switching section 24 selects a previously displayed board image Ib that is different from the board image Ib that is currently being displayed as the redisplay target based on the program IDs stored in the selected order storage region M and the details of the image switching operation. Then, the image switching section 24 instructs the board image display control section 22 to display the selected board image Ib as the redisplay target. Further in this embodiment, the images as the targets for switching by the image switching section 24 include the menu image Im. In other words, the image switching section 24 selects, from the menu image Im and the board images Ib corresponding to the program IDs stored in the selected order storage region M, the redisplay target image based on the details of the image switching operation by the user. Then, when the menu image Im is selected as the redisplay target image, the image switching section 24 instructs the menu image display control section 21 to redisplay the menu image Im. Note that, the board image display control section 22 may temporarily store image data of the board images Ib displayed previously on the screen S in the storage unit 12 in preparation for such redisplay. Alternatively, the board image display control section 22 may regenerate the board image Ib to be redisplayed every time the instruction for redisplay is received from the image switching section 24.

In this embodiment, the image switching operation is an operation of specifying a direction along one side of the screen S. Specifically, in the state in which the menu image Im or the board image Ib is displayed, when the user performs the slide operation to specify a direction along the upper side L1 and the lower side L4 of the screen S (positive X-axis direction or negative X-axis direction), the image switching section 24 receives the slide operation as the image switching operation. Then, the image switching section 24 determines the image to be redisplayed based on whether the specified direction is the positive X-axis direction or the negative X-axis direction and on the stored order of the program IDs stored in the selected order storage region M.

Next, a method of determining the switching target is described in detail. When an instruction in the negative X-axis direction is given in a state in which any one of the board images Ib as the switching target is displayed on the screen S, the image switching section 24 acquires, of the program IDs stored in the selected order storage region M, a program ID stored in the selected order storage region M immediately before the program ID corresponding to the board image Ib that is currently being displayed, and selects a board image Ib corresponding to the acquired program ID as the redisplay target. Note that, the board image Ib that is currently being displayed may be determined by referring to the pointer information managed by the selected order management section 23. On the other hand, when the specified direction is the positive X-axis direction, the image switching section 24 acquires the program ID stored in the selected order storage region M immediately after the program ID corresponding to the board image Ib that is currently being displayed, and selects the board image Ib corresponding to the acquired program ID as the redisplay target. In particular, when the instruction in the negative X-axis direction is given in a state in which a board image Ib corresponding to the program ID stored least recently in the selected order storage region M is displayed, the image switching section 24 does not switch the image because there is no program ID that is stored in the selected order storage region M before the program ID.

Further, when an instruction in the positive X-axis direction is given in a state in which a board image Ib corresponding to the program ID stored most recently in the selected order storage region M (that is, a board image Ib relating to the menu item image Ic selected most recently by the user) is displayed, the image switching section 24 selects the menu image Im as the redisplay target. Further, when an instruction in the opposite direction (that is, an instruction in the negative X-axis direction) is received in a state in which the menu image Im is displayed, the image switching section 24 sets the board image Ib corresponding to the program ID stored most recently in the selected order storage region M as the redisplay target. Note that, when an instruction in the positive X-axis direction is given in the state in which the menu image Im is displayed, the image switching section 24 does not switch the image.

Figure 10:
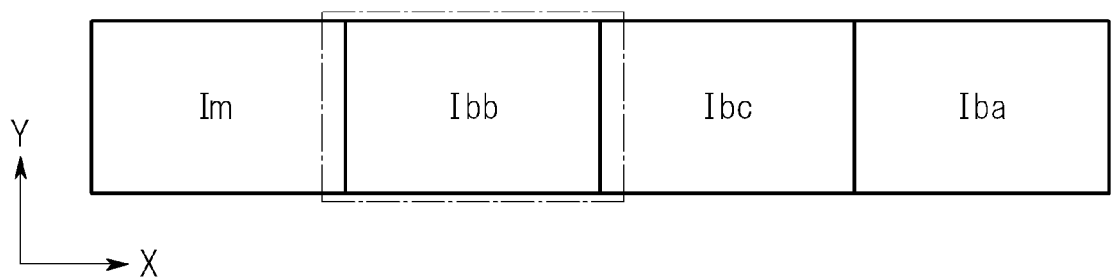
FIG. 10 is a diagram illustrating an example of a virtual array of a menu image and board images displayed previously.

According to the method of selecting the switching target described above, the information processing apparatus 10 may provide an effect that the menu image Im and the board images Ib that have been previously displayed are arranged in the horizontal direction of the screen S in the order selected by the user. FIG. 10 is a diagram illustrating an example of a virtual array of the menu image Im and the board images Ib, which corresponds to the contents stored in the selected order storage region M exemplified in FIG. 9A. In the above-mentioned switching procedure, in the virtual array, the menu image Im is always at the left end, and the board images Ib corresponding to the menu item images Ic that have been selected by the user are arranged in the horizontal direction in the order corresponding to the order in which the user selected the menu item images Ic. Specifically, in FIG. 10, a board image Iba corresponding to the program APa, a board image Ibc corresponding to the program APc, a board image Ibb corresponding to the program APb, and the menu image Im are arranged in this order from the right as seen from the user, in accordance with the selected order of the user. Note that, when the user newly selects a menu item image Ic in the menu image Im, the board image Ib corresponding to the menu item image Ic is inserted next to the menu image Im on the right side. The user performs the slide operation in the right direction or the left direction in the state in which the images are displayed to intuitively give an instruction to switch the image to be displayed in the board display region Ab as when the images that are being displayed are slid in the direction of the operation.

In order to further facilitate such intuitive operation, the board image display control section 22 displays, at the time of displaying the board image Ib in the board display region Ab, two representational images In in the board display region Ab along with the board image Ib. In this case, the representational images In are images that represent other board images Ib or the menu image Im to be displayed after the switching when the instruction for the image switching is given in the state in which the board image Ib is displayed.

Specifically, the board image display control section 22 displays a long rectangular first representational image In1 in the board display region Ab along the right side L2 of the screen S. The first representational image In1 is an image representing the board image Ib to be redisplayed when the slide operation in the negative X-axis direction is performed. The first representational image In1 may be a part of the board image Ib that is represented by the first representational image In1. More specifically, the image may be a left end portion of the represented board image Ib. In this case, the board image display control section 22 refers to the contents stored in the selected order storage region M to determine the board image Ib to be redisplayed when the slide operation in the negative X-axis direction is performed, and then clips the left end region of the board image Ib. Then, the clipped region is displayed as the first representational image In1 in the board display region Ab. Note that, the board image display control section 22 may clip, instead of the board image Ib itself, which renders the display elements in the program board B, the background image Iw to be included in the board image Ib to be redisplayed. Such processing may also display a part of the board image Ib as the first representational image In1.

Similarly, the board image display control section 22 displays a long rectangular second representational image In2 in the board display region Ab along the left side L3 of the screen S. The second representational image In2 is an image representing another board image Ib or the menu image Im to be redisplayed when the slide operation in the positive X-axis direction is performed. As with the first representational image In1, the second representational image In2 may be a part of the board image Ib or the menu image Im that is represented by the second representational image In2 (more specifically, right end portion of the represented image). In this case, the board image display control section 22 may display the second representational image In2 in the board display region Ab by determining, as in the case of the first representational image In1 described above, the image after the switching, and then performing clipping processing.

As described above, the information processing apparatus 10 can guide the user to the image to be displayed when the image switching operation is performed by displaying the representational image In along the right side L2 or the left side L3, which is a side connected to the upper side L1 and the lower side L4 of the screen S (that is, sides along the direction in which the user performs the image switching operation). For example, in a case where the contents stored in the selected order storage region M are as illustrated in FIG. 9A and the board image Ibb corresponding to the program APb is displayed in the board display region Ab, the board image display control section 22 displays an image representing the board image Ibc and an image representing the menu image Im as the first representational image In1 and the second representational image In2, respectively. As a result, an image corresponding to the rectangular region enclosed by the chain line of FIG. 10 is displayed in the board display region Ab. Therefore, it becomes easier for the user to visualize the array in which the images are virtually arranged as in FIG. 10.

Further, as with the case where the board image display control section 22 displays the board image Ib, when the menu image Im is displayed, the menu image display control section 21 may display the first representational image In1 representing the board image Ib corresponding to the menu item image Ic selected most recently along the right side L2 of the screen S.

Further, the board image display control section 22 may display, when the board image Ib corresponding to the program ID stored least recently of the program IDs stored in the selected order storage region M is displayed, a predetermined background image along the right side L2 of the screen S instead of the first representational image In1. Then, the use may easily understand that, in the state in which the board image Ib is displayed, the slide operation in the negative X-axis direction cannot be performed to switch the image.

When the user performs an operation to give an instruction to scroll in the state in which the board image Ib is displayed, the scroll control section 25 performs scroll control in accordance with the operation. Specifically, in this embodiment, the direction of the scroll instruction is a direction along the Y axis, and in the state in which the board image Ib is displayed, the user performs the slide operation in the positive Y-axis direction or a negative Y-axis direction to give the instruction to scroll. Specifically, the scroll control section 25 moves the display target range R in the negative Y-axis direction in the program board B when the slide operation in the positive Y-axis direction is received, and the scroll control section 25 moves the display target range R in the positive Y-axis direction when the slide operation in the negative Y-axis direction is received. As a result, as in the case of the image switching operation, the user may scroll the image that is being displayed as though the image displayed in the board display region Ab is slid in the direction of the slide operation. As a result of the scroll instruction, an image showing the display elements in the program board B, which were not displayed at the time when the board image Ib was first displayed, is displayed on the screen S as an image relating to the board image Ib that has been displayed first.

Further, the scroll control section 25 changes the amount by which the display target range R is moved in response to the scroll instruction by the user depending on the position of the display target range R in the program board B. Especially in this embodiment, in the case where the program board B corresponding to the full mode program AP1 is being displayed, the scroll control section 25 changes the amount by which the display target range R is moved in response to the scroll instruction based on whether or not a predetermined range in the program board B is included in the display target range R. Note that, the predetermined range here is a range including the program information region P1. In this embodiment, the size of the program information region P1 is identical with the size of the board display region Ab. Therefore, the length of the program information region P1 along the Y-axis direction (that is, the direction of the scroll instruction) corresponds to the length of the display target range R along the Y-axis direction.

Specifically, while the program information region P1 is not included in the display target range R, the scroll control section 25 moves the display target range R by the movement amount corresponding to an amount specified by the scroll instruction. Note that, the amount specified in the scroll instruction may be a value that corresponds to the amount of operation performed by the user, for example, the distance by which the finger of the user moved on the detection surface of the touch sensor 15 when the user performs the slide operation. Alternatively, the amount may be a value calculated based on the speed at which the user moves his/her finger or the strength with which the user presses the detection surface instead of, or in addition to, the amount of operation. Alternatively, the amount may be a value corresponding to the number of times the user has performed operation satisfying predetermined conditions. For example, in a case where the specified amount of the scroll instruction is the distance by which the finger of the user is moved in the slide operation, the display target range R moves in the program board B by the distance by which the finger of the user is moved. On the other hand, in the case where the operation of the scroll instruction performed by the user is such scroll instruction that the program information region P1 is included in the display target range R, the scroll control section 25 moves the display target range R so as to include the entire program information region P1. As a result, at the time when the scroll instruction is complete, the display target range R is always moved to one of a position at which the entire program information region P1 is included and a position at which the program information region P1 is not included at all and only the communication region P2 is included, to thereby avoid a case where the display target range R is stopped at a position that straddles from the program information region P1 to the communication region P2 (that is, a position at which both a part of the program information region P1 and a part of the communication region P2 are included). Here, the program information region P1 is designed so as to be displayed on the screen S in its entirety. Therefore, by performing such scroll control, it is possible to ensure that the program information region P1 is displayed as intended by the designer.

Further, in a case where the scroll instruction performed by the user is a scroll instruction for such specified amount that the program information region P1 is included at a predetermined ratio or more with respect to the entire display target range R, the scroll control section 25 may move the display target range R so as to include the entire program information region P1. In this case, when the scroll instruction has such specified amount that the program information region P1 is included at a ratio less than the predetermined ratio with respect to the entire display target range R, the scroll control section 25 may be configured not to perform the scroll control (that is, the display target range R is not moved from the position before the scroll instruction).

After the user finishes the slide operation and releases his/her finger from the touch sensor 15, the scroll control section 25 may determine the position of the display target range R after the scroll depending on the operation amount of the slide operation performed before the finger is released, to thereby execute the scroll control so that the display target range R is moved to the determined position. Alternatively, even during the slide operation when the user still keeps his/her finger with the touch sensor 15, the scroll control may be performed so that the display target range R is moved depending on the movement of the contact position of the finger. In this case, when the completion of the scroll instruction is received (that is, when the user releases his/her finger from the detection surface of the touch sensor 15), the scroll control section 25 further moves the display target range R depending on the position of the display target range R at that time point. Specifically, in a state in which the scroll instruction is being received (that is, a state in which the user moves his/her finger while keeping the finger in contact with the detection surface of the touch sensor 15), for example, the scroll control section 25 moves the display target range R by the movement amount corresponding to the specified amount of the scroll instruction irrespective of the position of the display target range R. Then, in a case where the program information region P1 is included at the predetermined ratio or more in the display target range R when the completion of the scroll instruction is received (that is, in a case where a scroll instruction for such specified amount that the program information region P1 is included at the predetermined ratio or more with respect to the entire display target range R is given by the user), the scroll control section 25 further moves the display target range R so as to include the entire program information region P1. This way, the user may perform the scroll instruction half way while verifying how the program information region P1 is gradually displayed on the screen S, and release his/her finger from the detection surface of the touch sensor 15 at a time point when a considerable part of the program information region P1 is included in the board display region Ab, to thereby display the entire program information region P1 in the screen S without giving the scroll instruction with such specified amount that the entire program information region P1 is included. Note that, in this case, when the program information region P1 is included at a ratio less than the predetermined ratio in the display target range R when the user releases the finger, the scroll control section 25 is configured to return the display target range R, which has been moved halfway in the scroll instruction, to the position at which the program information region P1 is not included. This way, it is possible to prevent the scroll from being stopped in a state in which the program information region P1 is only partly included in the board display region Ab.

Further, in the state in which the entire program information region P1 is displayed as the board image Ib, even when such scroll instruction as to include the communication region P2 is received, the scroll control section 25 may change the method of the scroll control depending on whether the scroll instruction has such specified amount that the communication region P2 is included in the display target range R at the predetermined ratio or more. Specifically, when the received scroll instruction has such specified amount that the communication region P2 is included at the predetermined ratio or more, the scroll control section 25 is configured to move the display target range R to a position at which none of the program information region P1 is included (that is, only the communication region P2 is included). On the other hand, when the received scroll instruction has such specified amount that the communication region P2 is included in the display target range R at the ratio less than the predetermined ratio, the scroll control section 25 is configured to return the display target range R to the original position at which only the program information region P1 is displayed.

Note that, the above-mentioned determination as to whether or not the certain subregion is included at the predetermined ratio or more may be made based on, when the display target range R is moved along the scroll direction by the movement amount corresponding to the specified amount of the scroll instruction, whether or not a coordinate value (here, Y coordinate value) indicating the position of the display target range R with respect to the program board B is within a predetermined range.

Specific examples of the above-mentioned scroll control are described with reference to FIGS. 11A to 11F. Note that, the figures each illustrate a state in which a part of the program board B illustrated in FIG. 6 is displayed on the screen S as the board image Ib, and the broken arrow of the figures indicate a movement path of the finger of the user on the detection surface.

Figure 11A:
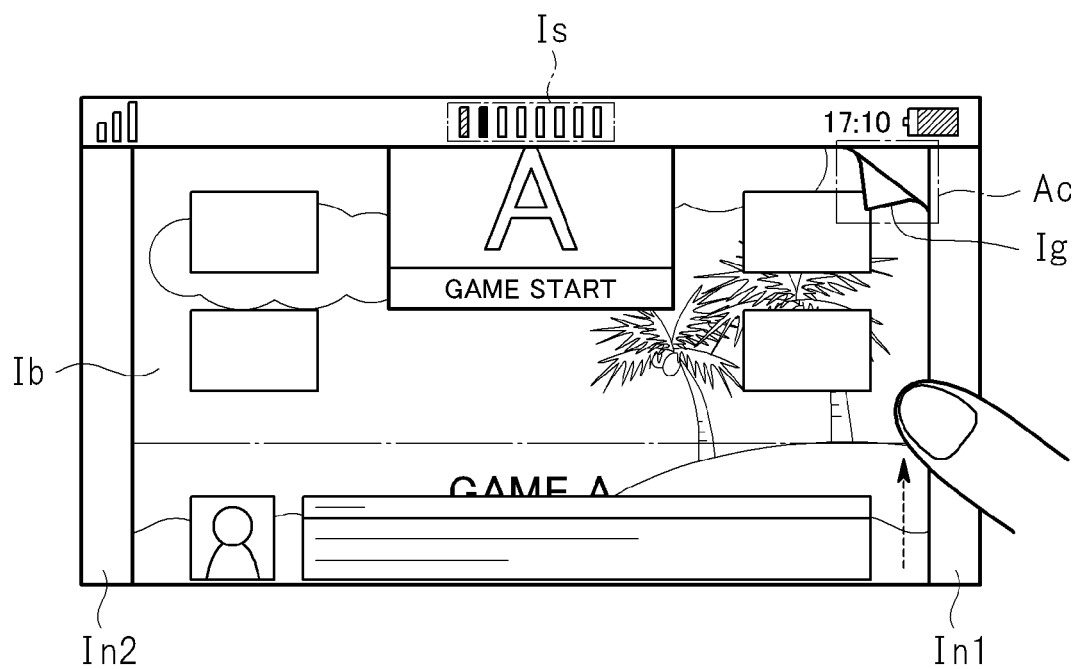
FIG. 11A is a diagram illustrating an example of how a scroll operation is performed on the board images.
Figure 11B:
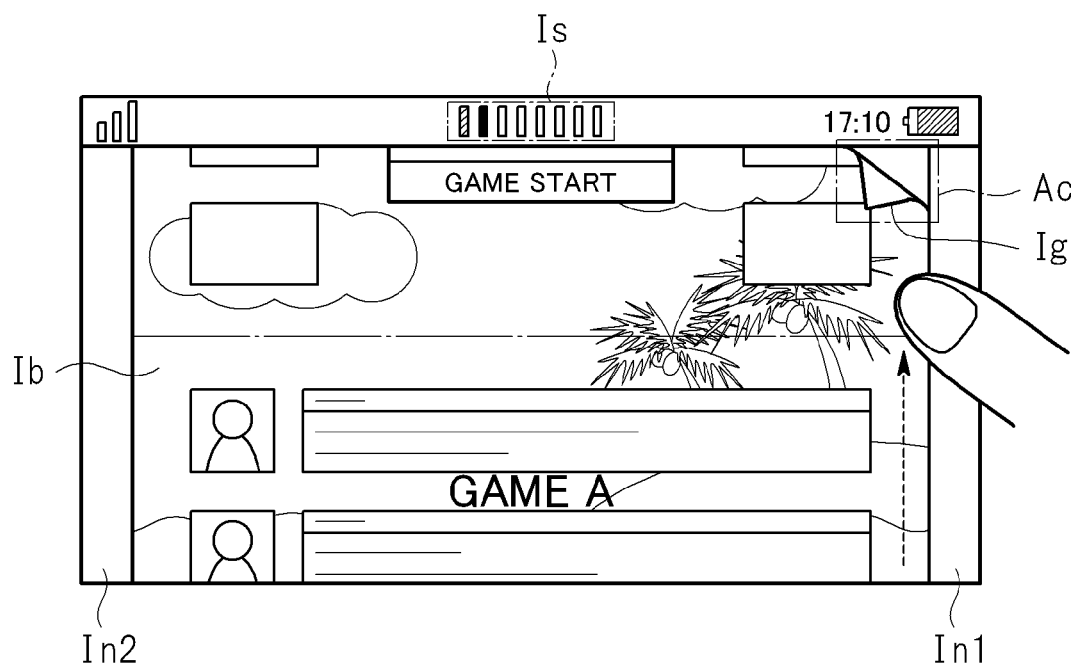
FIG. 11B is a diagram illustrating another example of how the scroll operation is performed on the board images.

First, in the state in which the program information region P1 is displayed as the board image Ib as illustrated in FIG. 8, it is assumed that the user performs the slide operation in the positive Y-axis direction. At this time, while the user keeps his/her finger in contact with the detection surface, the display target range R is moved in the program board B in the negative Y-axis direction by the same amount as the movement amount of the finger of the user. This way, as illustrated in FIG. 11A, the contents at the upper end of the communication region P2 is gradually displayed in the board display region Ab. Here, when the predetermined ratio is 50%, in the state of FIG. 11A, the contents of the communication region P2 are not displayed to occupy the lower half of the board display region Ab. Therefore, when the user releases his/her finger in this state, the display target range R returns to the position corresponding to the program information region P1 again to redisplay the board image Ib illustrated in FIG. 8. On the contrary, the user moves his/her finger further in the positive Y-axis direction from the state of FIG. 11A to result in a state as illustrated in FIG. 11B, in which the communication region P2 occupies more than a half of the board display region Ab. In this state, when the user releases the finger to complete the scroll instruction, the scroll control section 25 further moves the display target range R to the position at which the program information region P1 is not included. As a result, as illustrated in FIG. 11C, the board display region Ab displays the upper end portion of the communication region P2.

In this state, when the user performs the slide operation further in the positive Y-axis direction, the scroll control section 25 moves the display target range R by an amount corresponding to the operation amount of the slide operation (that is, operation amount of the finger on the detection surface). This way, the user may browse information contained below in the program board B at will. FIG. 11D illustrates how the scroll control is performed through the slide operation in the communication region P2.

Figure 11C:
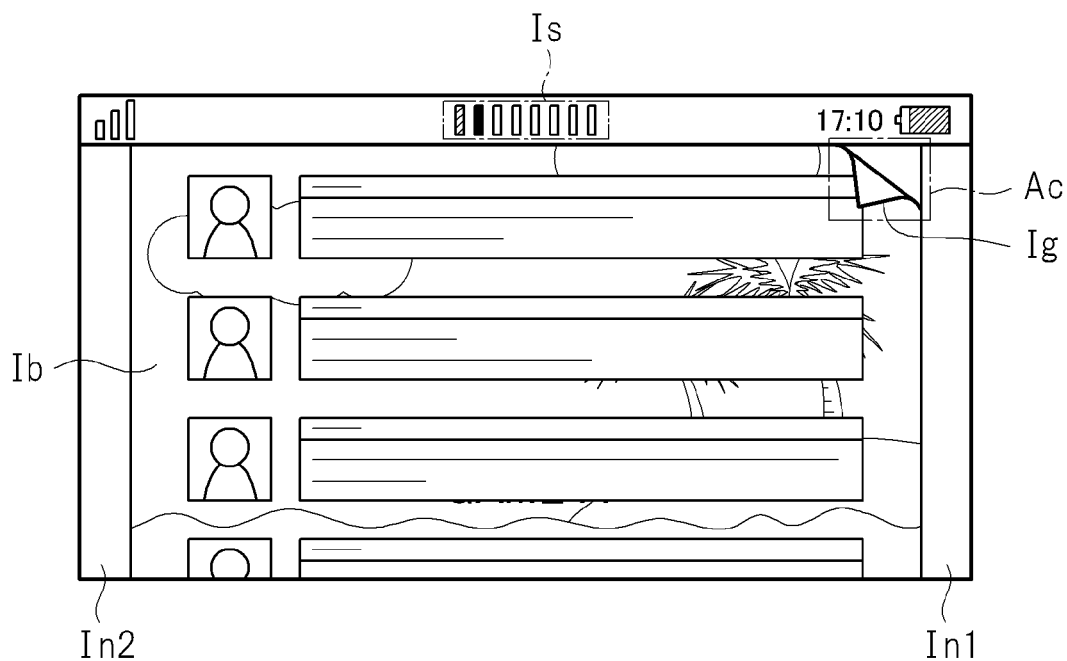
FIG. 11C is a diagram illustrating an example of a state in which, as a result of the scroll operation, a board image showing the inside of a communication region is displayed.
Figure 11D:
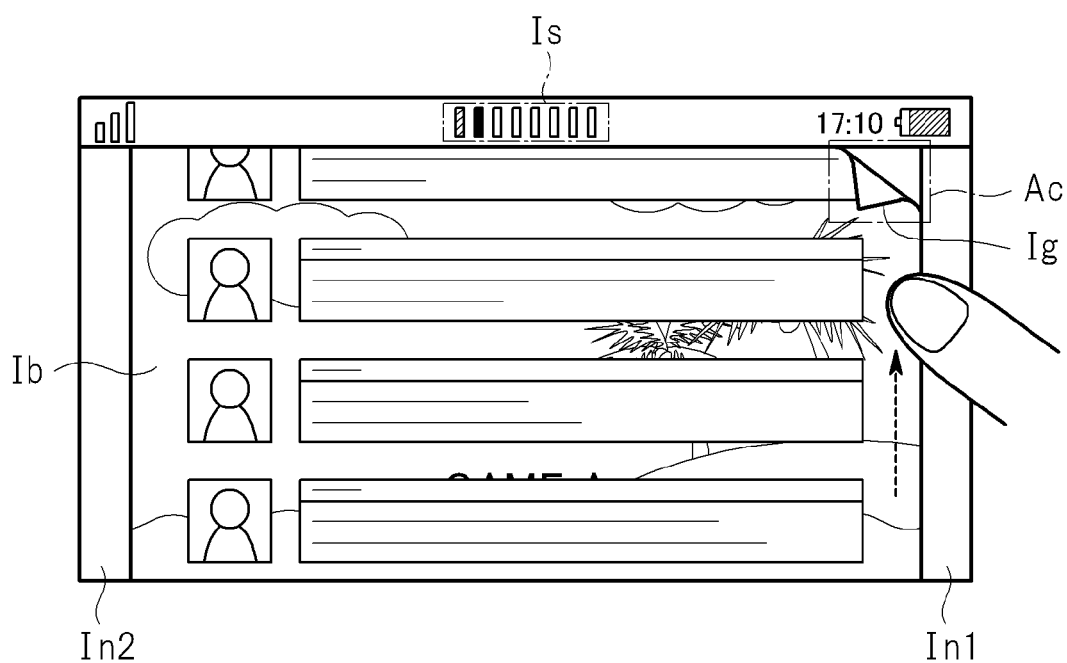
FIG. 11D is a diagram illustrating still another example of how the scroll operation is performed on the board images.
Figure 11E:
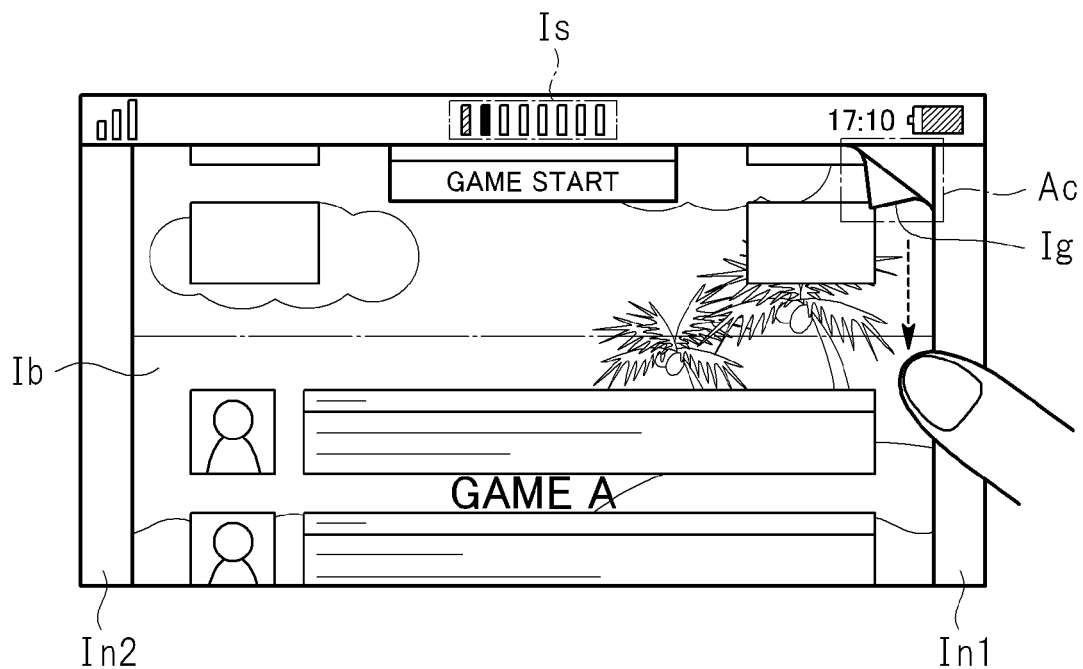
FIG. 11E is a diagram illustrating still another example of how the scroll operation is performed on the board images.
Figure 11F:
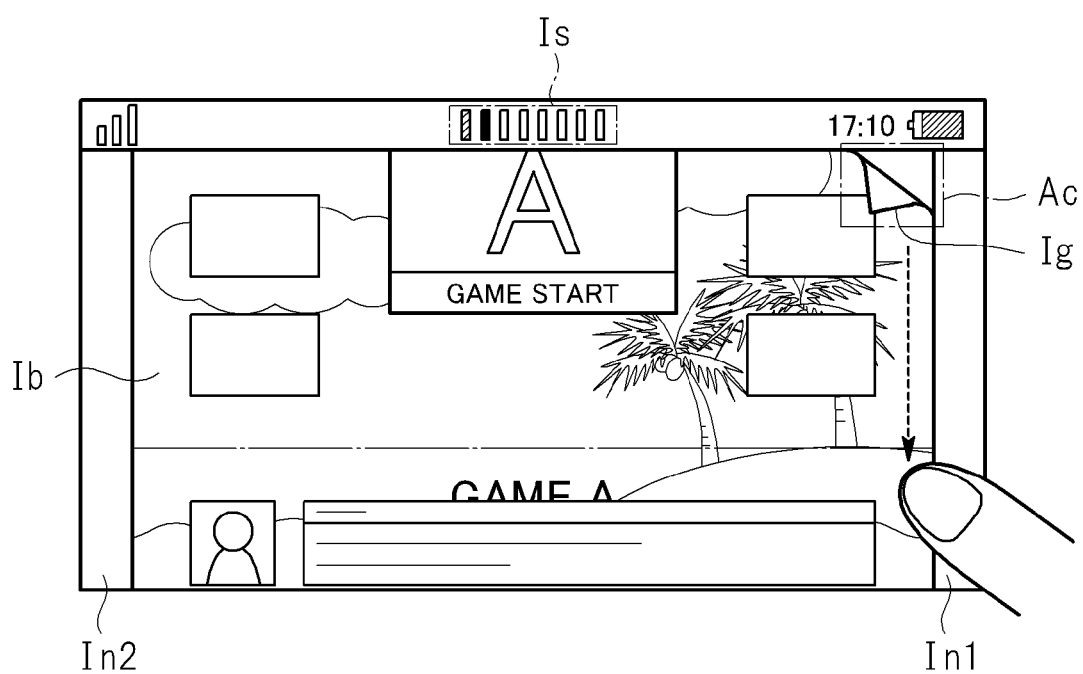
FIG. 11F is a diagram illustrating still another example of how the scroll operation is performed on the board images.

Further, when the user performs the slide operation of moving his/her finger in the negative Y-axis direction in the state illustrated in FIG. 11C, the display target range R is moved in the positive Y-axis direction while the user keeps the finger in contact with the detection surface, and the program information region P1 is displayed gradually from the bottom side in the board display region Ab to result in the state of FIG. 11E. When the user releases the finger in this state, the program information region P1 is not included in the display target range R at a ratio of 50% or more, and hence the display of the screen S returns to the state illustrated in FIG. 11C. On the contrary, a case is assumed where the user slides his/her finger further in the positive Y-axis direction so that the contents of the program information region P1 are displayed in the board display region Ab to reach the state illustrated in FIG. 11F, and then the user releases the finger. In this case, the display target range R is further moved in the positive Y-axis direction, and the entire program information region P1 is displayed in the board display region Ab again as illustrated in FIG. 8.

Note that, in the above description, with the program information region P1 being one unit region, the scroll control is performed to result either in a state in which the entire unit region is displayed in the board display region Ab or in a state in which none of the unit region is displayed in the board display region Ab. However, the program board B may include a plurality of unit regions to be subjected to such control in succession. Also in this case, when a scroll instruction to newly include a partial range of any of the unit regions in the display target range R is received, the scroll control section 25 may move the display target range R so as to include the entire unit region in the display target range R. This way, the scroll control may be performed to result either in a state in which each unit region is displayed in its entirety in the board display region Ab, or in a state in which none of the unit region is displayed in the board display region Ab. Therefore, it is possible to prevent the scrolling from being stopped in the state in which only a part of any unit region is displayed in the board display region Ab. Note that, the unit region in this case is a region of such size that at least its length along the direction of the scroll instruction (Y-axis direction) corresponds to the length of the display target range R along the Y-axis direction.

Alternatively, the scroll control section 25 may move, when the scroll instruction for such specified amount that a border position of a plurality of subregions included in the program board B is included, the display target range R by a movement amount that is determined based on the relationship between the border position and the position of the display target range R after the movement by the movement amount corresponding to the specified amount. Specifically, when the scroll instruction for such movement amount that the border position is included in a predetermined range (for example, range in the vicinity of the center) in the display target range R is received, the scroll control section 25 may be configured to move the display target range R further so as to position the border position outside the predetermined range. Further, the display target range R may be moved so that the border position is aligned with the periphery of the display target range R. The scroll control based on the above-mentioned unit region is also scroll control that aligns the border position between the program information region P1 and the communication region P2 with the periphery of the display target range R. Alternatively, the scroll control section 25 may move the display target range R so as to position the border position closer to the center of the display target range R by a predetermined distance from the periphery of the display target range R. In this case, only the end portions close to the border position of adjacent subregions are included in the display target range R.

Note that, as illustrated in FIGS. 11A to 11F, in this embodiment, the scroll control section 25 subjects only display elements arranged in the program board B to the scroll control, and does not subject the background image Iw to the scroll control. That is, even when the scroll control section 25 scrolls the images displayed in the board display region Ab, the display position of the background image Iw does not change. Therefore, it becomes easier for the user to visualize the images after switching when the above-mentioned image switching operation is performed to switch the board image Ib. This is further described below.

In this embodiment, an instruction in the direction (X-axis direction) intersecting the direction of the scroll instruction (Y-axis direction) is the direction of the instruction to switch the board image Ib. Therefore, when the user visualizes how the switching target images are arranged in the X-axis direction as illustrated in FIG. 10, the image switching operation is facilitated. However, in a case where the switching target images are images indicating a part of the display region extending in the Y-axis direction, when the scroll control along the Y-axis direction is performed, it becomes harder to directly visualize the image array as illustrated in FIG. 10. Specifically, it is assumed that, for example, information illustrated in FIG. 9A is stored in the selected order storage region M, and an image showing the inside of a program board Bb corresponding to the program APb is displayed as the board image Ibb. Here, if the same board image Ibc is displayed in a case where a program information region P1$b$ of the program board Bb is first displayed, and then, without scrolling, the image switching operation is performed to display the board image Ibc showing the inside a program board Bc corresponding to the program APc, and in a case where the scroll is performed to display images in a communication region P2$b$ of the program board Bb, and then the image switching operation is performed to display the board image Ibc, it becomes harder for the user to understand the spatial relation between the program board Bb corresponding to the program APb and the program board Bc corresponding to the program APc. Nevertheless, if the display target range R in the program board Bc is moved with the movement of the display target range R in the program board Bb, when the image switching operation is performed, the board image Ib showing a place in the program board Bc that is not intended by the user may be displayed. Therefore, in this embodiment, the range (initial display range) in the program board B to be displayed as the board image Ib when the image switching operation is performed is a predetermined range irrespective of whether or not the display target range R is moved by the scroll control before the image switching operation. By thus preventing the display position of the background image Iw from being changed even by the scroll control, even when such scroll control is performed, it becomes possible for the user to visualize a background image Iwc of the program board Bc and a background image Iwb of the program board Bb as being arranged in the direction along the image switching operation (X-axis direction) as illustrated in FIG. 10. Therefore, the user may perform a scroll operation specifying a direction along the Y-axis direction and the image switching operation specifying a direction along the X-axis direction naturally.

Figure 12:
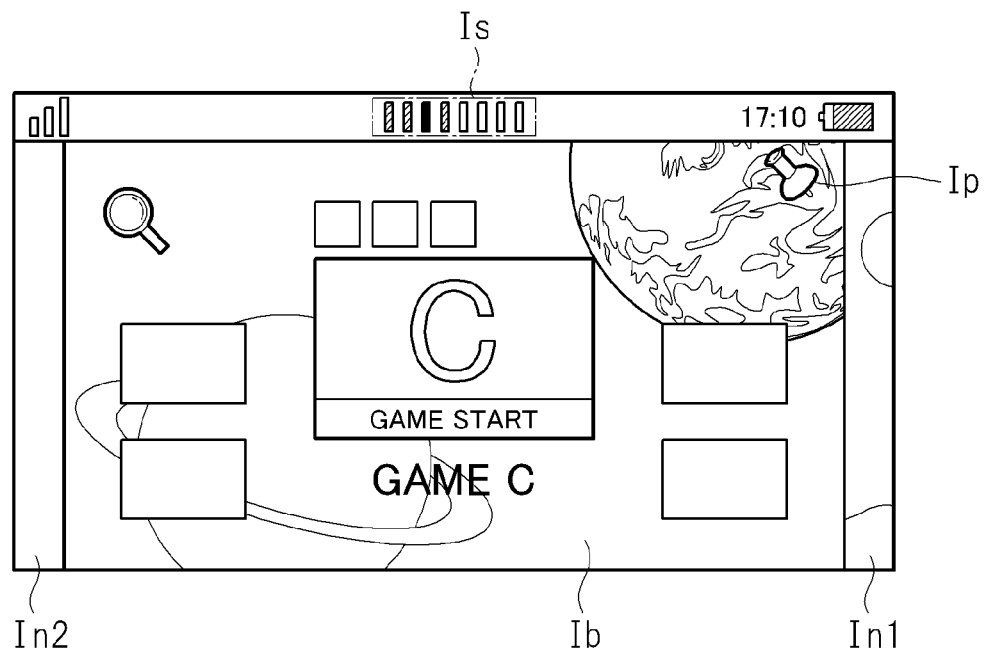
FIG. 12 is a diagram illustrating an example of a screen displaying a board image after an image switching operation.

Note that, the initial display range in the program board B included in the board image Ib to be displayed when the image switching operation is performed may be a fixed position range (hereinafter, referred to as a default range), for example, a range at the top end of the program board B (the program information region P1 in the case of the full mode program AP1). FIG. 12 illustrates an example of the screen S including the board image Ib to be displayed as a result of the image switching operation in this case. This figure illustrates a display example in a case where, in a state in which the data illustrated in FIG. 9A is stored in the selected order storage region M and the board image Ib showing the inside of the program board B corresponding to the program APa is displayed, the image switching operation specifying the positive X-axis direction is performed. In this case, even when the image switching operation is performed in the state in which, for example, the board image Ib showing the inside of the program information region P1 as illustrated in FIG. 8 is displayed, or when the image switching operation is performed in the state in which the board image Ib showing the inside of the communication region P2 as illustrated in FIG. 11C is displayed, the board image display control section 22 displays the board image Ib showing the inside of the default range (here, the program information region P1) of the program board B corresponding to the program APc on the screen S as illustrated in FIG. 12. In other words, regardless of which range in the program board B corresponding to the program APa is displayed on the screen S, the same position in the program board B corresponding to the program APc is displayed as the board image Ib after the image switching.

Further, when the image showing the inside of the program board B to be redisplayed was displayed previously as the board image Ib, the initial display range after the image switching operation may be a range in the program board B displayed most recently. In this case, when the image switching operation is performed, the image switching section 24 stores the position of the display target range R in the program board B displayed immediately before the image switching. When the program board B is selected to be redisplayed as the board image Ib as a result of the image switching operation, the board image Ib is generated based on the stored position of the display target range R.

Alternatively, the initial display range may be determined depending on the subregion in the program board B that has been displayed until the image switching operation is performed. Specifically, in this embodiment, for any full mode program AP1, the program board B corresponding to the full mode program AP1 is configured to include two subregions: the program information region P1; and the communication region P2. Then, in a case where the image switching operation from, for example, the board image Ibc showing the inside of the program board Bc of the program APc to the board image Ibb showing the inside of the program board Bb of the program APb is performed, when a program information region P1$c$ of the program board Bc has been displayed immediately before the image switching operation, the program information region P1$b$ of the program board Bb, which is a subregion corresponding to the program information region P1$c$ (here, a subregion including the same kind of information as that of the program information region P1$c$), is displayed. Further, when a communication region P2$c$ of the program board Bc has been displayed immediately before the image switching operation, a range at the top end of the communication region P2$c$ of the program board Bb, which is a subregion corresponding to the communication region P2$c$, is displayed after the image switching operation. This makes it easy to display the subregions, in which the same kind of information is displayed, in a switching manner among a plurality of program boards B as the targets of the image switching operation. Note that, in this embodiment, the program board B includes two subregions. However, the present invention is not limited thereto, and the plurality of program boards B may each include a plurality of mutually corresponding subregions so that the subregions are displayed in a switching manner.

Here, the way of determining the initial display range after the image switching operation may be changed depending on the instruction previously given by the user. For example, the information processing apparatus 10 may prompt the user to select which of the default range, the range of the program board B displayed most recently, and a range that is determined depending on the subregion of another program board B that has been displayed immediately before the image switching, is to be set as the initial display range after the image switching.

The symbol image display section 26 displays a predetermined number of symbol images Is on the screen S. Here, the number of the symbol images Is displayed by the symbol image display section 26 may be a number corresponding to the upper limit of the images as the targets for switching by the image switching section 24. As described above, in this embodiment, the upper limit N of the program IDs stored in the selected order storage region M is 7, and accordingly, at most seven board images Ib become the targets for switching by the image switching section 24. Therefore, the symbol image display section 26 displays at least seven symbol images Is. Further, the symbol image display section 26 displays, of the symbol images Is, the same number of symbol images Is as that of the board images Ib as the targets for switching by the image switching section 24 in a manner that is different from the other symbol images Is. Specifically, for example, when the information illustrated in FIG. 9A is stored in the selected order storage region M, three board images Ib become the targets for switching by the image switching section 24. In this case, the symbol image display section 26 displays the three symbol images Is in a manner that is different from the other four symbol images Is. Here, the three symbol images Is are the symbol images (hereinafter, referred to as board-corresponding symbol images Isb) corresponding to the three board images Ib which are targets of the switching by the image switching section 24, and the other four symbol images Is are symbol images (hereinafter, referred to as non-corresponding symbol images Isn) that do not correspond to the board images Ib. Displaying the symbol images Is in this way allows the user to understand how many board images Ib are currently the targets for switching by the image switching section 24, and how many more board images Ib may be added to the targets for switching by the image switching section 24 before reaching the upper limit N (=7). For example, when four non-corresponding symbol images Isn are displayed, four more board images Ib may be added to the targets for image switching. As described above, when an attempt is made to store a new program ID in the state in which the same number of the program IDs as the upper limit N are stored in the selected order storage region M, the program ID stored least recently in the selected order storage region M is deleted. As a result, the board image Ib corresponding to the deleted program ID is excluded from the targets for switching by the image switching section 24. Therefore, the user may select a new menu item image Ic while verifying the symbol images Is, to thereby prevent the board images Ib displayed previously from being excluded unintendedly from the targets for switching by the image switching section 24.

Note that, the board-corresponding symbol images Isb may be images representing the corresponding board images Ib. In this case, each board-corresponding symbol image Isb is displayed in a manner that is not only different from the non-corresponding symbol images Isn but also different from the other board-corresponding symbol images Isb. Alternatively, each board-corresponding symbol image Isb may be displayed in the same manner as the other board-corresponding symbol images Isb. Further, each non-corresponding symbol image Isn may be displayed in the same manner as the other non-corresponding symbol images Isn. Further, in this embodiment, the menu image Im is also a target for the image switching by the image switching section 24. Therefore, the symbol image display section 26 may also display a symbol image Is (hereinafter, referred to as menu-corresponding symbol image Ism) corresponding to the menu image Im. In this case, the symbol image display section 26 displays eight symbol images Is at the same time. In this case, the menu-corresponding symbol image Ism is displayed in a manner that is at least different from the non-corresponding symbol images Isn. Further, the menu-corresponding symbol image Ism may be a unique image which represents the menu image Im and is displayed in a manner that is also different from the board-corresponding symbol images Isb. Alternatively, the menu-corresponding symbol image Ism may be displayed as a type of target images for image switching by the image switching section 24 in the same manner as the board-corresponding symbol images Isb.

Further, the symbol images Is may be displayed on the screen S in a state in which the symbol images Is are arranged along the direction of the image switching operation (here, X-axis direction). Then, the symbol images Is are displayed in a manner corresponding to the virtual array of the menu image Im and the board images Ib as illustrated in FIG. 10, and hence it becomes easier for the user to understand what is represented by each of the symbol images Is.

In this embodiment, as described above, eight symbol images Is are displayed in the status bar display region As. In the case where the symbol images Is are displayed together with the board images Ib and the menu image Im on the screen, the symbol image Is corresponding to the board image Ib or the menu image Im that is currently being displayed on the screen S may be displayed in a manner that is distinguishable from others. In other words, the symbol image display section 26 may change the way each of the plurality of board-corresponding symbol images Isb and the menu-corresponding symbol image Ism is displayed depending on whether or not the corresponding menu image Im or board image Ib is displayed in the board display region Ab, to thereby display the symbol image Is corresponding to the board image Ib or the menu image Im that is being displayed in a manner that is distinguishable from others. Specifically, for example, the symbol image display section 26 changes the size or lightness of the symbol image Is corresponding to the image that is being displayed or adds a predetermined image (for example, image representing a frame border) indicating correspondence with the image that is being displayed to the symbol image Is, to thereby display the symbol image Is corresponding to the image that is being displayed in a manner that is distinguishable from others. This allows the user to understand the virtual positional relationship between the image that is currently being displayed and the other switching target images by browsing the symbol images Is.

As an example, FIG. 5 illustrates the way the symbol images Is are displayed in a case where the menu image Im is displayed and no board image Ib has been displayed (that is, there is no board image Ib as a target for switching by the image switching section 24). In this case, only the symbol image Is which is located at the left end as seen from the user and corresponds to the menu image Im is displayed in a manner that indicates correspondence with the image that is currently being displayed (specifically, displayed in a color or shape that is different from the other symbol images Is, for example). On the other hand, the remaining seven symbol images Is are displayed in a manner that indicates no correspondence with the menu image Im or the board image Ib (for example, displayed in a predetermined color). Further, FIG. 8 illustrates the way the symbol images Is are displayed in a case where only the board image Ib as the switching target is the image that is currently being displayed. Here, the second symbol image Is from the left corresponding to the board image Ib that is currently being displayed is displayed in a manner that is different from the other symbol images Is, and the symbol image Is at the left end corresponding to the menu image Im that is the target for switching by the image switching section 24 is also displayed in a manner that is different from the other six symbol images Is (the non-corresponding symbol images Isn that do not correspond to any images).

Further, FIG. 12 illustrates an example of the way the symbol images Is are displayed in a case where the information illustrated in FIG. 9A is stored in the selected order storage region M and the board image Ibc corresponding to the program APc is displayed in the board display region Ab. In this case, as with the example of FIG. 8, the third symbol image Is from the left corresponding to the board image Ibc that is currently being displayed is displayed in a manner that is different from the other symbol images Is, and the three symbol images Is corresponding to the other three images as the targets for switching by the image switching section 24 (that is, the menu image Im, the board image Ibb, and the board image Iba) are also displayed in a manner that is different from the remaining four symbol images Is. This allows the user to understand by browsing the symbol images Is that four more images may be added to the targets for switching by the image switching section 24, that the image switching operation in the negative X-axis direction may be performed one more time, and that the menu image Im is displayed when the image switching operation in the positive X-axis direction is performed two more times.

Figure 13:
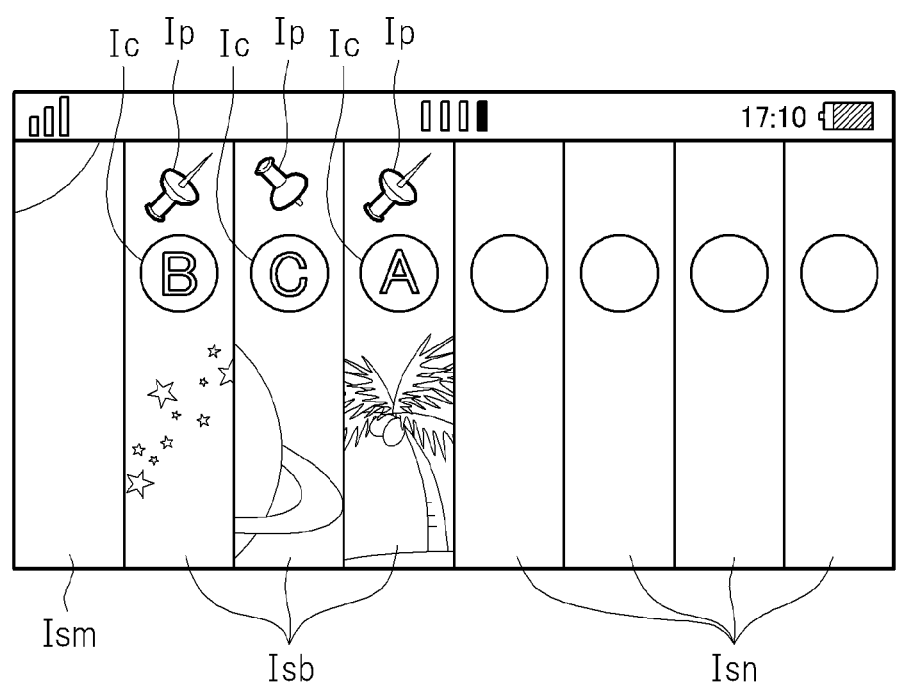
FIG. 13 is a diagram illustrating an example of a screen displaying symbol images.

Further, FIG. 13 illustrates a display example of the symbol images Is that is different from the display in the status bar display region As as described above. In the example of this figure, the symbol image display section 26 switches the display contents in response to a predetermined operation by the user (for example, operation of pressing the operation button 16) to erase the board image Ib or the menu image Im that has been displayed in the board display region Ab and display a total of eight symbol images Is in the board display region Ab. In the example of this figure, the symbol images Is are rectangular regions extending along the Y-axis direction and are arranged along the X-axis direction. Of the symbol images Is, the board-corresponding symbol images Isb corresponding to the board images Ib as the targets for switching by the image switching section 24 include images relating to the board images Ib corresponding to the board-corresponding symbol images Isb, respectively. Specifically, in the example of FIG. 13, the board-corresponding symbol images Isb include the menu item images Ic of the corresponding application programs AP. Further, the board-corresponding symbol images Isb include parts of the background images Iw included in the board images Ib as their background images, respectively. Note that, the board-corresponding symbol images Isb may include parts of the corresponding board images Ib themselves instead of the background images Iw. Further, each of the board-corresponding symbol images Isb includes a pin image Ip. The pin image Ip is an image indicating whether or not the board image Ib corresponding to the board-corresponding symbol image Isb is in the display termination restriction state. Note that, the display termination restriction state is described later. On the contrary, each of the four non-corresponding symbol images Isn on the right that do not correspond to any board images Ib as the switching targets includes a circular image containing nothing to indicate the non-corresponding symbol images Isn. Further, the background image in the non-corresponding symbol images Isn may be a predetermined default image. Note that, the menu-corresponding symbol image Ism which is located at the left end and corresponds to the menu image Im does not have any corresponding menu item images Ic, and hence a part of the background image of the menu image Im is simply displayed.

Note that, in the display example of the symbol images Is illustrated in FIG. 13, the user may tap the display position of each symbol image Is to instruct the image switching. In this case, the menu image Im or the board image Ib corresponding to the tapped symbol image Is is displayed in the board display region Ab. In addition, when the user brings his/her finger into contact with the display position of any of the symbol images Is, the display range of the symbol image Is is temporarily enlarged with respect to the other symbol images Is so that a wider range of, for example, the background image Iw may be verified. Further, when the user moves the finger on the detection surface in that state, the focus may move sequentially to the symbol image Is containing the position to which the finger is moved to enlarge the display range of the symbol image Is in focus. Note that, in a case where the information processing apparatus 10 according to this embodiment includes directional keys such as cursor keys, the selection operation of the symbol image Is may be performed by using the directional keys. In this case, the user operates the directional keys to shift the focus on the symbol image Is and select the menu image Im or the board image Ib to be displayed. In this example, when a shift is made from the state in which the menu image Im or the board image Ib has been displayed to the screen displaying the symbol images Is in response to the user's instruction, the symbol images Is may be displayed in a state in which the symbol image Is corresponding to the menu image Im or the board image Ib that has been displayed is in focus.

Further, in the display example of FIG. 13, instead of displaying eight symbol images Is in the board display region Ab, only the symbol images that are in the same number as and represent the menu image Im and the board images Ib as the targets for switching by the image switching section 24 are displayed in the status bar display region As. Note that, the symbol images may be displayed in the status bar display region As in the same manner also in the other display examples of the screen S.

The program activation section 27 executes processing of activating an application program AP in response to the instruction operation by the user. Specifically, as described above, when the user selects a menu item image Ic corresponding to the light program AP2 in the state in which the menu image Im is displayed, the program activation section 27 performs processing of activating the light program AP2. When the user performs an operation of tapping the activation button image IL in the state in which a board image Ib corresponding to a full mode program AP1 is displayed, the program activation section 27 performs processing of activating the full mode program AP1.

Further, when a user's operation on a predetermined display element in a board image Ib is received in a state in which the board image Ib is displayed, the program activation section 27 may execute the processing of activating the application program AP associated with the display element. For example, there may be a case where, in the program information region P1 of a program board B corresponding to a full mode program AP1, an image representing a link to a web page displaying information relating to the full mode program AP1. When the user performs an operation of tapping such image representing the link, the program activation section 27 activates a browser program and provides the browser program with information (such as URL) associated with the tapped image as, for example, activation parameters. As a result, the board image Ib representing the processing result of the browser program is newly generated to be displayed in the board display region Ab.

When an instruction is given to activate a program other than the application program AP corresponding to the board image Ib in the state in which the board image Ib as described above, the selected order management section 23 may manage the program ID of the program activated in response to such activation instruction in association with the program ID of the program corresponding to the old board image Ib. As a specific example, it is assumed that, in the state in which the board image Ib corresponding to the program APa is displayed, the program APb is newly activated in response to the user's operation. In this case, the selected order management section 23 stores parent-child relationship information associating the board image Ib corresponding to the program APa as a calling image (parent image) and the board image Ib corresponding to the program APb as a called image (child image). As described above, when an attempt is made to display the number of board images Ib exceeding the upper limit N, the selected order management section 23 deletes any of the program IDs that is determined based on predetermined conditions. Similarly, when the user performs a display termination operation to be described later, the selected order management section 23 deletes the program ID corresponding to the board image Ib that is subjected to the display termination operation. However, the selected order management section 23 may refer to the parent-child relationship information to restrict deletion of a predetermined program ID. Specifically, for example, even when a program ID corresponding to one child image satisfies the conditions as the target for deletion, when a program ID corresponding to a board image Ib associated as the parent image with respect to the child image still remains in the selected order storage region M, the selected order management section 23 may select a deletion target from the other program IDs instead of deleting the program ID corresponding to the child image. On the contrary, even when a program ID corresponding to one parent image satisfies the conditions as the target for deletion, when the program ID corresponding to the board image Ib which is a child image of the parent image is not deleted, the selected order management section 23 may select a deletion target from the other program IDs instead of deleting the program ID corresponding to the parent image.

Next, display termination processing and display termination restriction processing for a board image Ib are described. As described above, when the number of menu item images Ic exceeding the predetermined upper limit N are selected, the board images Ib corresponding to the menu item images Ic selected previously are excluded from the targets for switching by the image switching section 24 in order from the oldest. However, there may be other cases where the user explicitly wants to terminate the display of the board image Ib that he or she caused to be displayed. Therefore, when the user performs a predetermined display termination operation in the state in which any of the board images Ib is displayed, the board image display control section 22 terminates the display of the board image Ib, and the selected order management section 23 deletes the program ID corresponding to the board image Ib from the selected order storage region M. This excludes the board image Ib from the targets for switching by the image switching section 24. Note that, when the display of the board image Ib is to be terminated, as in the case where an image switching operation in a predetermined direction (for example, positive X-axis direction) is performed when the board image Ib for which the display is to be terminated is displayed, the board image display control section 22 redisplays the board image Ib or the menu image Im corresponding to the program ID stored in the selected order storage region M subsequent to the program ID corresponding to the board image Ib for which the display is to be terminated.

On the other hand, the board images Ib as the targets for switching by the image switching section 24 may include the one for which the user does not want to terminate the display. For such board image Ib, the user may perform an instruction operation for restricting the termination of the display of the board image Ib in order to prevent the display from being terminated when the user performs the above-mentioned display termination operation by mistake or selects the number of menu item images Ic exceeding the predetermined upper limit N. Specifically, when a predetermined display termination restriction operation is received from the user, the board image display control section 22 transitions to a state of restricting the termination of the display of the board image Ib on which the operation is performed. That is, in response to a request from the board image display control section 22, the selected order management section 23 updates the value of the display termination restriction flag associated with the program ID corresponding to the board image Ib on which the operation is performed to a value indicating that the display termination is restricted. Thereafter, even when the display termination operation on the board image Ib is received, the board image display control section 22 does not execute the display termination processing. Further, when a new menu item image Ic is selected in a state in which the same number of the program IDs as the upper limit N are stored in the selected order storage region M, the selected order management section 23 determines, of the program IDs having the value of the display termination restriction flag indicating that the display termination is not restricted, the program ID stored least recently in the selected order storage region M, and deletes the program ID from the selected order storage region M. As a specific example, when a new menu item image Ic is selected in a state in which the information illustrated in FIG. 9C is stored in the selected order storage region M, of the program IDs stored in the selected order storage region M, the program ID (program APc) stored least recently in the selected order storage region M is associated with the flag value indicating that the display termination is restricted, and hence the display of the board image Ibc corresponding to the program APc is not terminated. Instead, the program APb, which is the program ID stored next to the program APc in the selected order storage region M, is deleted.

Here, the display termination operation is an operation of specifying, in a state in which the board image Ib as an operation target is displayed in the board display region Ab, a first direction with respect to a predetermined operation target region Ac. Specifically, in this embodiment, the display termination operation is a slide operation of specifying a diagonal lower left direction with respect to the operation target region Ac provided at the upper right corner of the board display region Ab (that is, direction from the operation target region Ac toward the center of the screen S). Further, the display termination operation is a slide operation from one point inside the operation target region Ac as a start point toward the outside of the operation target region Ac.

Further, the display termination restriction operation is an operation of specifying, in the state in which the board image Ib as the operation target is displayed in the board display region Ab, a second direction that is different from the first direction, which is the direction specified by the display termination operation, with respect to the same operation target region Ac as that of the display termination operation. Specifically, in this embodiment, the display termination restriction operation is a slide operation of specifying a diagonal upper right direction, which is the opposite direction from the direction specified by the display termination operation, with respect to the operation target region Ac. Further, the display termination operation is a slide operation from the outside of the operation target region Ac toward an end point, the end point being one point in the operation target region Ac.

As described above, the display termination operation and the display termination restriction operation are operations that specify a direction with respect to the same operation target region Ac. Therefore, the user is able to learn the display termination operation and the display termination restriction operation in association with each other. Further, because the operations are operations of specifying the opposite directions, one of the operations is an operation performed with the start point inside the operation target region Ac, and the other operation is an operation performed with the end point inside the operation target region Ac, despite the fact that the operations are performed on the same operation target region Ac, it is possible to avoid such erroneous operation as to perform one of the operations when the other operation is intended. Note that, in the above description, the display termination operation is the operation with the start point inside the operation target region Ac and the display termination restriction operation is the operation with the start point outside the operation target region Ac. However, each of the operations may be an operation having one point inside the operation target region Ac as the start point.

In addition, as described above, the operation position guide image Ig for guiding to the operation target region Ac is displayed on the screen S. Therefore, the user can easily grasp the position of the operation target region Ac. Further, in this embodiment, the operation position guide image Ig is an image showing how the background image Iw is turned back from the upper right corner of the board display region Ab toward the lower left direction (that is, the direction specified by the display termination operation). Therefore, the user can terminate the display of the board image Ib by performing the slide operation of stroking the screen S starting from the position as when to peel the background image Iw off the screen S. Note that, as illustrated in FIGS. 11A to 11F and the like, even when the display target range R is moved by the scroll control section 25, the positions of the operation position guide image Ig and the operation target region Ac in the screen S do not change. Therefore, irrespective of the scrolling state, the user can perform the display termination operation on the operation target region Ac at any time to terminate the display of the board image Ib. The display position of the background image Iw in the board image Ib does not change either irrespective of the scrolling state, and hence it is possible to avoid causing discomfort to the user even though the position of the operation position guide image Ig does not change.

Figure 14:
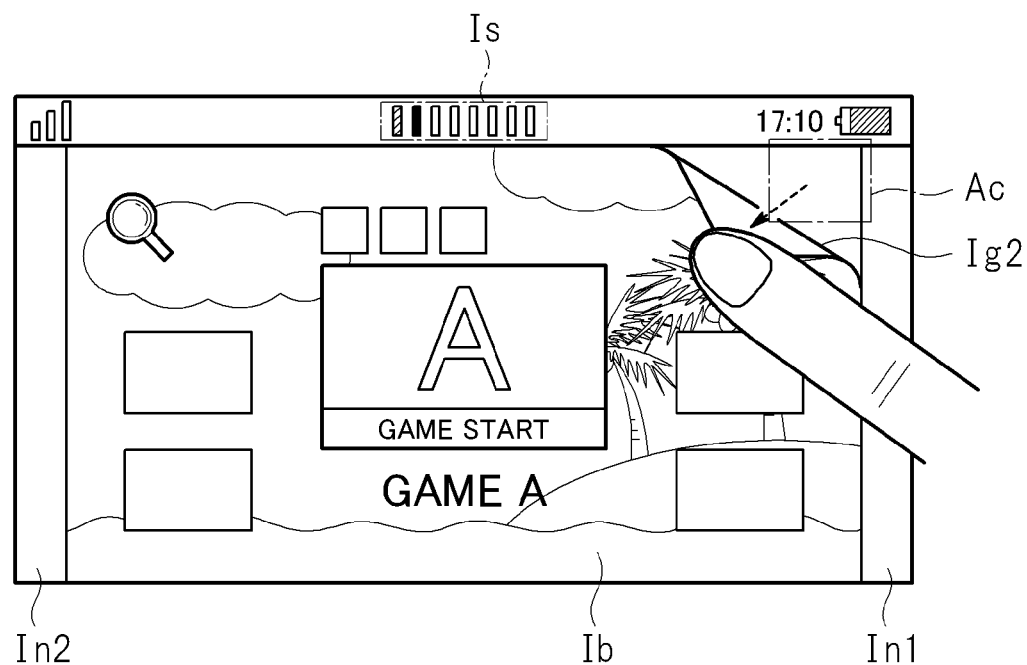
FIG. 14 is a diagram illustrating how a display termination operation is performed on the board image.

In addition, when it is determined that the user has started the display termination operation, the board image display control section 22 may display an in-operation image Ig2 indicating that the operation has been started on the screen S. After the in-operation image Ig2 is displayed, when the user further executes the slide operation in the lower left direction, the board image display control section 22 may terminate the display of the board image Ib that is being displayed. As a specific example, when the user performs the slide operation in the lower left direction starting from a start point inside the operation target region Ac, the board image display control section 22 displays, while the finger of the user is in contact with the detection surface of the touch sensor 15, the in-operation image Ig2 that gradually changes in accordance with the operation amount of the slide operation. Then, based on the operation amount of the slide operation at the time point when the user releases his/her finger, the board image display control section 22 judges whether or not to execute the processing of terminating the display of the board image Ib. That is, the board image display control section 22 judges whether the operation amount of the slide operation satisfies predetermined conditions, and when the predetermined conditions are satisfied, terminates the display of the board image Ib. For example, when the operation amount of the slide operation exceeds a predetermined threshold, the board image display control section 22 judges that the display termination operation is complete, and terminates the display of the board image Ib that is being displayed. On the other hand, when the operation amount is equal to or less than the predetermined threshold, the board image display control section 22 judges that the display termination operation is not complete, and redisplays the original operation position guide image Ig without terminating the display of the board image Ib. Alternatively, when the position of the end point of the slide operation started from the start point inside the operation target region Ac is a predetermined distance or more away from a reference point inside the operation target region Ac (for example, point corresponding to the upper right corner of the board display region Ab), the board image display control section 22 may judge that the completion conditions of the display termination operation are satisfied. This way, when the user has started the display termination operation by mistake, the user can be aware of the mistake before the display termination operation is complete. Therefore, when the user stops the slide operation immediately at the point when the in-operation image Ig2 is displayed, the display termination operation may be stopped. Note that, the in-operation image Ig2 may be an image that is obtained by changing the operation position guide image Ig. FIG. 14 is a diagram illustrating a state in which the display termination operation is being performed. In the example of this figure, as the in-operation image Ig2, an image showing how the background image Iw is turned back more than the operation position guide image Ig is displayed. In particular, the in-operation image Ig2 may be updated so that the background image Iw is turned back even more depending on the operation amount as the user continues the slide operation. This way, the user can intuitively understand that the display termination operation is going to be performed.

Figure 15:
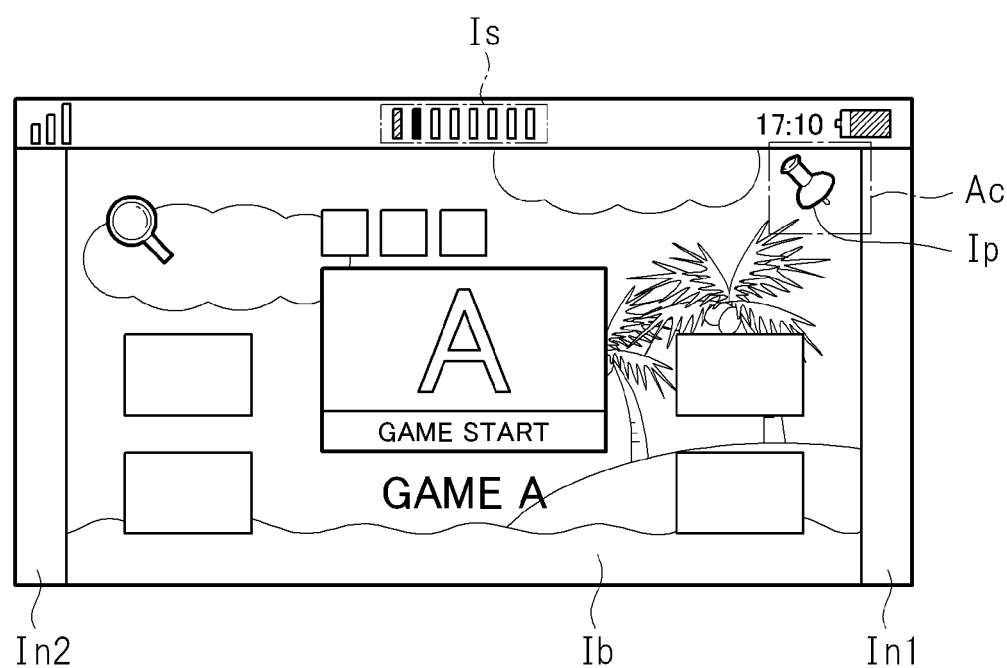
FIG. 15 is a diagram illustrating an example of the board image in a display termination restriction state.

Further, when the display termination restriction operation is performed, the board image display control section 22 displays an image indicating that the target board image Ib has shifted to the state in which the display termination is restricted. Specifically, in this embodiment, the board image display control section 22 displays, at the display position of the operation position guide image Ig, a pin image Ip indicating the display termination restriction state. The pin image Ip is an image showing how a pin is stuck on the screen S. FIG. 15 is a diagram illustrating an example of the screen S displaying the board image Ib that is in the display termination restriction state. In this figure, the operation position guide image Ig is deleted so that the background image Iw is displayed also in the operation target region Ac, and a pin image Ip showing how a pin is stuck in the operation target region Ac is displayed. The user is expected to turn his/her eyes on the display position of the operation position guide image Ig when the user is to perform the display termination operation. Therefore, by displaying the image indicating the display termination restriction state at such position, it is possible to prevent the user from attempting to execute the display termination operation that is being restricted. Note that, in this case, when an operation of tapping the pin image Ip displayed in the operation target region Ac is received, the board image display control section 22 may cancel the display termination restriction state of the board image Ib.

The board image display control section 22 may also receive another display termination restriction operation than the operation on the operation target region Ac described above. For example, an image showing a pin that is in a state of not being stuck on the screen S may be displayed in the program information region P1 in addition to the above-mentioned pin images Ip, and a tap operation on the image showing the pin may be received from the user to shift to the display termination restriction state. In this case, the image showing the pin is updated to the image showing how the pin is stuck as in FIG. 15, and the display termination restriction state may be canceled when the updated image is tapped. Further, when an operation of tapping a pin image Ip included in a symbol image Is is received in a state in which the symbol image display section 26 displays the symbol images Is as illustrated in FIG. 13, the board image display control section 22 may shift the board image Ib corresponding to the symbol image Is including the pin image Ip to the display termination restriction state, or cancel the display termination restriction state. Note that, in FIG. 13, the pin image Ip in the board-corresponding symbol images Isb corresponding to the board image Ibc of the program APc is an image showing the state in which the pin is stuck, as opposed to the other pin images Ip. This indicates that the board image Ibc is in the display termination restriction state.

Figure 18:
FIG. 18 is a diagram illustrating another example of the data contents stored in the selected order storage region.
Figure 19:
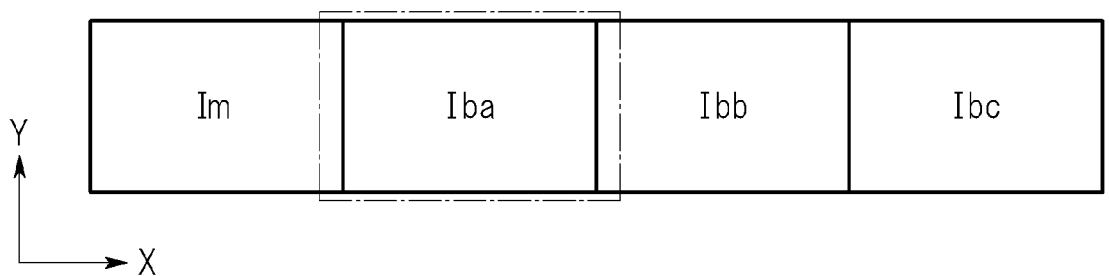
FIG. 19 is a diagram illustrating another example of the virtual array of the menu image and the board images displayed previously.

Described next is processing to be performed by the information processing apparatus 10 in a case where the user selects the menu item image Ic, which corresponds to the board image Ib selected previously by the user and hence is the target for switching by the image switching section 24, again in the state in which the menu image Im is displayed. In this case, the board image display control section 22 redisplays the board image Ib corresponding to the selected menu item image Ic in the board display region Ab. Further, the selected order management section 23 rearranges the order of the program IDs in the selected order storage region M so as to indicate that the program ID of the application program AP corresponding to the selected menu item image Ic is the application program AP selected most recently. For example, it is assumed that, in a state in which the information illustrated in FIG. 9A is stored in the selected order storage region M, the user displays the menu image Im and selects a menu item image Ic representing the program APa. In this case, contents of the data to be stored in the selected order storage region M are updated to the contents illustrated in FIG. 18. As a result, the virtual array of the menu image Im and the board images Ib is changed from that illustrated in FIG. 10 to that illustrated in FIG. 19. Therefore, when the user performs the slide operation in the positive X-axis direction in a state in which the board image Iba corresponding to the program APa is displayed, the menu image Im is redisplayed. On the contrary, when the user performs the slide operation in the negative X-axis direction in a state in which the board image Iba is displayed, the board image Ibb corresponding to the program APb is redisplayed.

Figure 20:
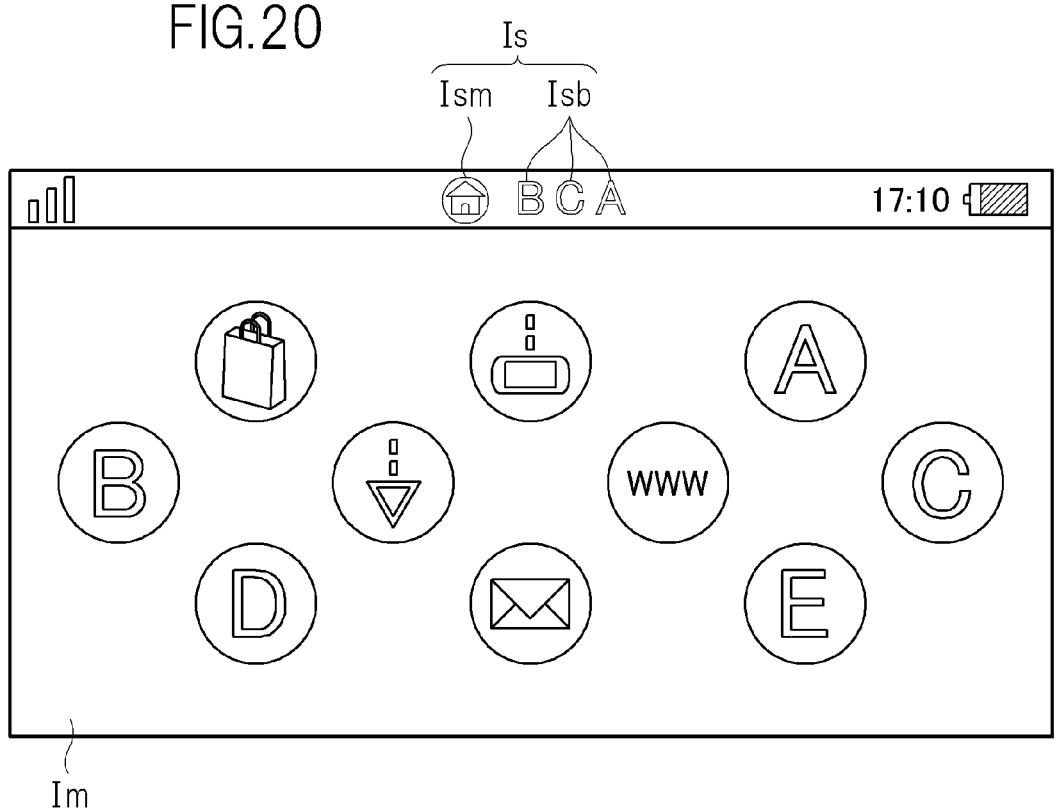
FIG. 20 is a diagram illustrating a display example of the symbol images representing the board images.

Further, in a case where the symbol images Is representing the board images Ib are displayed in the screen S at the same time in a state in which the menu image Im or the board images Ib are displayed, the order of arrangement of the symbol images Is displayed in the screen S may be updated with the update of the order of the program IDs stored in the selected order storage region M described above. As described above, each board-corresponding symbol image Isb may be an image that is different from the other board images Ib so as to represent the corresponding board images Ib. FIG. 20 is a diagram illustrating a display example of the board-corresponding symbol images Isb in a case where the information illustrated in FIG. 9A is stored in the selected order storage region M. The example of this figure illustrates a state in which the menu image Im is displayed in the board display region Ab, and the symbol images Is representing the menu image Im and three board images Ib, which are at present the targets for image switching by the image switching section 24, are displayed in the status bar display region As. Specifically, of the four symbol images Is displayed in the status bar display region As, the image representing a home at the left end is the menu-corresponding symbol image Ism. Further, to the right of the menu-corresponding symbol image Ism, the three board-corresponding symbol images Isb representing the board image Ibb, the board image Ibc, and the board image Iba are arranged in this order. Note that, in the example of this figure, the symbol image Is representing the image that is currently being displayed in the board display region Ab (here, menu image Im) may be highlighted by such a method as displaying the symbol image Is with a lightness that is higher than those of the other symbol images Is or adding an image representing a frame border to the symbol image Is so as to be distinguishable from the other symbol images Is that are not currently being displayed in the board display region Ab.

Figure 21:
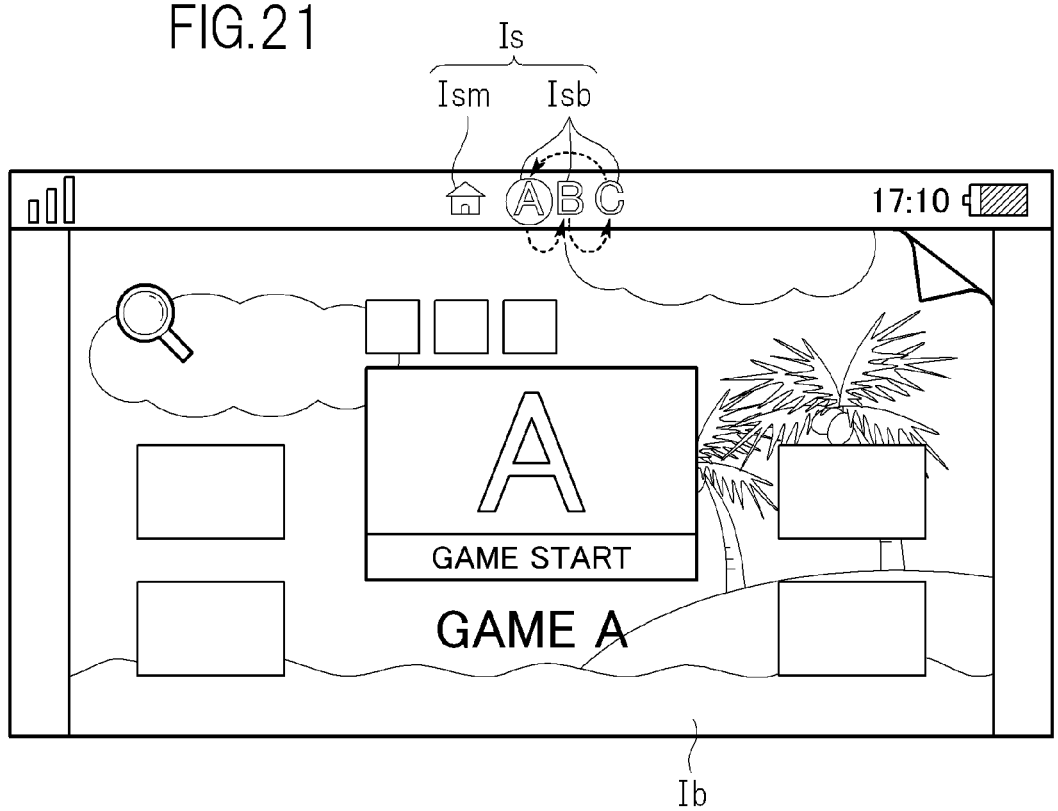
FIG. 21 is a diagram illustrating how the symbol images are shifted.

In such state, when the user taps a menu item image Ic corresponding to the program APa, the board image Iba corresponding to the program APa is redisplayed in the board display region Ab as described above. At this time, the symbol image display section 26 displays the board-corresponding symbol image Isb representing the board image Iba, which was at the right end, to the immediate right of the menu-corresponding symbol image Ism. Further, when performing such update of the display, the symbol image display section 26 may display a moving image representing the process in which each symbol image Is is moved in the screen S. FIG. 21 illustrates how the board image Iba is redisplayed in the board display region Ab and the symbol images Is in the status bar display region As are updated. In this figure, the broken arrows represent the process steps in which the board-corresponding symbol images Isb are moved from the state illustrated in FIG. 20. This way, by displaying the board-corresponding symbol images Isb representing the board images Ib in a manner that is distinguishable from each other and by changing the order in which the symbol images Is are arranged correspondingly when the stored order in the selected order storage region M is changed, it is easier for the user to grasp which of the board images Ib will be displayed when the image switching operation is performed next time.

Note that, the information processing apparatus according to the embodiment of the present invention is not limited to that described above. For example, the information processing apparatus 10 may include, in place of or in addition to the touch sensor 15 provided so as to overlap the screen S, a touch sensor on the rear surface side of the casing of the information processing apparatus 10 (rear side with respect to the surface on which the screen S is provided). In this case, the touch sensor on the rear surface side also includes the detection surface corresponding to the screen S, and the user may give the scroll instruction or the instruction to switch the image by performing the slide operation of moving his/her finger or the like on the touch sensor.

Further, in the above description, the user performs the operation of specifying the direction by using the touch sensor, but the user may specify the direction with respect to the information processing apparatus 10 by using various other operation devices. Specifically, for example, the user may specify the direction by dragging or a wheel operation of a mouse, or may specify the direction by pressing a directional key such as a cursor key. Note that, in the case where the direction is specified by using the wheel operation of the mouse, the cursor key, or the like, the relationship between the direction specified by the user and the scrolling direction or the image switching direction may be reversed from the case of the slide operation on the touch sensor or the drag operation of the mouse. This is because, although the user specifies the direction as when to move the image displayed on the screen S in the case of performing the slide operation or the drag operation of the mouse, it is common for the user to specify the direction as when to move the view point with respect to the image in the case of operating the cursor key or the like.

Further, by displaying a scroll bar, the information processing apparatus 10 may receive an operation performed by the user on the scroll bar by using the touch sensor or the mouse as a scroll operation of specifying a direction. In this case, the information processing apparatus 10 displays an operation target object representing the region that is currently being displayed (that is, the position of the display target range R) in the scroll bar extending along the scroll direction. The user may perform the scroll operation by performing the slide operation on the touch sensor 15 with the display position of the operation target object as the start point, or dragging the operation target object with the mouse.

Further, in the above description, the image switching operation is an operation of specifying a direction along the X-axis direction and the scroll operation is an operation of specifying a direction along the Y-axis direction, but the direction to be specified may be other directions. Specifically, for example, the specified directions may be interchanged between the image switching operation and the scroll operation.

Further, in the above description, the number of images as the targets for switching by the image switching section 24 is limited to the predetermined upper limit N or less because, when the board image display control section 22 sets a new board image Ib as the display target, the image set least recently by the board image display control section 22 as the display target is excluded from the switching targets. However, the upper limit of the images as the targets for switching by the image switching section 24 may be controlled by another method. For example, when a new menu item image Ic is selected by the user in a state in which the board images Ib that amount to the predetermined upper limit N are already set as the switching targets, the board image display control section 22 may restrict the display of the new board image Ib corresponding to the selected new menu item image Ic.

Further, in the above description, the images as the targets for switching by the image switching section 24 include one menu image Im and a plurality of board images Ib associated with respective programs, but the image switching section 24 may set other images as the switching targets. For example, the image switching section 24 may include a predetermined resident image in the switching targets. In the above description, when the image switching operation is performed in the negative X-axis direction from the state in which the menu image Im is displayed, the plurality of board images Ib are displayed in turn, and when, on the contrary, the slide operation is performed in the positive X-axis direction in the state in which the menu image Im is displayed, the image switching is not performed. Accordingly, such resident image may be displayed on the screen S when the slide operation is performed in the positive X-axis direction in the state in which the menu image Im is displayed.

Alternatively, the image switching section 24 may display the resident image when the image switching operation is performed in the negative X-axis direction instead of the positive X-axis direction in the state in which the menu image Im is displayed. In this example, the menu image Im is redisplayed when the image switching operation is performed in the positive X-axis direction in the state in which the resident image is displayed, and the board image Ib associated with the menu item image Ic selected most recently by the user is displayed when the image switching operation is performed in the negative X-axis direction in the state in which the resident image is displayed. Further, when the image switching operation is performed in the positive X-axis direction in the state in which the board image Ib associated with the menu item image Ic selected most recently by the user is displayed, the resident image is displayed. Note that, for the image switching operation between the board images Ib, the plurality of board images Ib are switched for display in the order that the user has selected the board images Ib every time the image switching operation is performed similarly to the examples described above. As a result, the user visualizes the virtual image array as illustrated in FIG. 10 as arranging the resident image next to the menu image Im on the right side. This way, even when the image switching operation is performed in the positive X-axis direction in the state in which the board image Ib associated with the menu item image Ic selected most recently by the user is displayed, the menu image Im is not redisplayed immediately, but the resident image is displayed first. Thereafter, when the image switching operation is further repeated in the same positive X-axis direction, the menu image Im is redisplayed. However, in this example, as with the examples described above, the state in which the board image Ib associated with the menu item image Ic selected most recently by the user is displayed is the state in which the menu image Im may be redisplayed with the fewest operations, and when the menu image Im is to be redisplayed by performing the image switching operation in a state in which a board image Ib associated with another menu item image Ic selected by the user is displayed, the state in which the board image Ib associated with the menu item image Ic selected most recently by the user is displayed is always gone through. Note that, the resident image here may be, for example, an image for displaying information or the like provided by the provider of the information processing apparatus 10.

Further, in the above description, the application programs AP as the targets for displaying associated images in this embodiment are any of the full mode programs AP1 and the light programs AP2, but may include other programs. Further, the application programs AP as the targets for displaying the associated images in this embodiment may be only the light programs AP2. In this case, when the user gives an instruction to select a menu item image Ic in the state in which the menu image Im is displayed, the light programs AP2 corresponding to the menu item image Ic selected according to the user's instruction are activated sequentially, and the image showing the processing results is displayed as the board image Ib. In this case, based on the computer resource such as the memory available on the information processing apparatus 10 or the like, the number of the light programs AP2 that can be activated at the same time is limited to a predetermined upper limit N2 or lower. In such case, as in the example in which the symbol images Is as illustrated in FIG. 13 are displayed based on the upper limit N of the images as the targets for switching by the image switching section 24, the symbol image display section 26 may display the same number of symbol images Is as the predetermined upper limit N2 on the screen S. At this time, by displaying the same number of symbol images Is as the number of the light programs AP2 that have already been activated in a manner that is different from the other symbol images Is, the user can easily grasp from the symbol images Is how many light programs AP2 are currently being activated and how many more light programs AP2 can be activated.

Note that, in this case, when an instruction is given to activate a new light program AP2 in a state in which light programs AP2 that amount to the upper limit N2 are activated, execution of the program activated least recently of the light programs AP2 that is being activated may be forced to terminate so that the information processing apparatus 10 may limit the number of the light programs AP2 activated at the same time to the upper limit N2 or less. Alternatively, the information processing apparatus 10 may store, for each of the light programs AP2 that is being activated, the timing at which the user accessed the light program AP2 most recently, and when the instruction is made to activate the light programs AP2 exceeding the upper limit N2, the execution of the program having the oldest timing at which the program was accessed most recently may be forced to terminate. Note that, in those cases, the information processing apparatus 10 may output, before forcing the execution of the program activated least recently or the program having the oldest timing at which the program was accessed most recently to terminate, a message for confirming the forced termination of the execution of the program by displaying on the screen S, for example. Then, when the user gives a response to the message to permit the forced termination, the execution of the program is forced to terminate in response thereto. On the other hand, when the user does not give such response, the forced termination of the execution of the program is stopped, and on the contrary, activation of the light program AP2 for which activation is newly instructed is restricted. Alternatively, in a case where the light programs AP2 that amount to the upper limit N2 are already activated, the activation of the new light program AP2 may be unconditionally restricted so that the information processing apparatus 10 may limit the number of the light programs AP2 activated at the same time to the upper limit N2 or less.

Figure 16A:
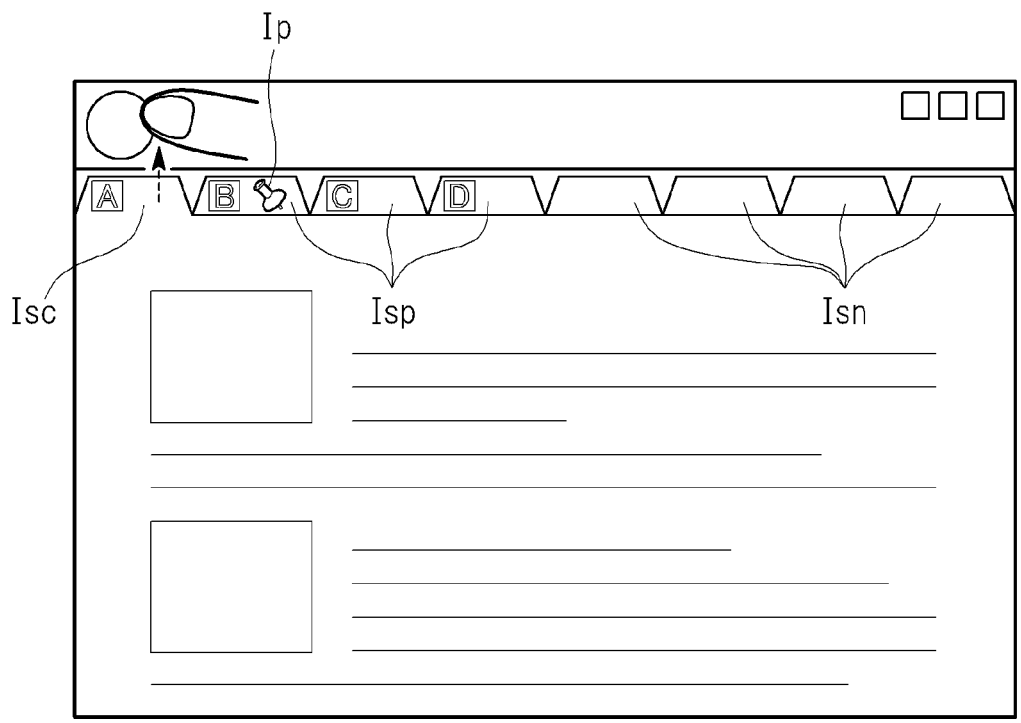
FIG. 16A is a diagram illustrating an example of a display screen of a tab browser.

Note that, the processing of displaying the symbol images and the processing in response to the display termination operation and the display termination restriction operation described above are applicable not only to the board images Ib associated with the programs as described above, but also to an information processing apparatus for switching various images for display. As an example, a case where such technology is applied to a tab browser for displaying a plurality of tabs in a switching manner is described below. FIG. 16A is a diagram illustrating an example of a display screen of the tab browser. The tab browser in this example can display at most eight page images (images representing the contents of web pages) in a switching manner, and generation of the number of page images exceeding eight is restricted. Corresponding to the upper limit of the page images, a total of eight tabs (symbol images) are displayed side by side horizontally in the upper part of the screen. However, not all the symbol images are associated with the page images. Of the symbol images, the symbol image at the left end (displayed symbol image Isc) is a symbol image representing a tab corresponding to the page image that is currently being displayed. The displayed symbol image Isc indicates that the symbol image corresponds to the displayed page image by deleting the border line with the page image display region provided below. Further, the second to fourth symbol images from the left are page-corresponding symbol images Isp representing tabs corresponding to page images that are not currently being displayed. The displayed symbol image Isc and the page-corresponding symbol images Isp each include an image representing the corresponding page image (for example, icon image or the like). Further, in the symbol image corresponding to the page image for which the display termination is restricted, a pin image Ip illustrating the state in which the display termination is restricted is displayed. Meanwhile, the four symbol images in the right half are the non-corresponding symbol images Isn that are not associated with any page image, and are displayed in a manner that is different from the page-corresponding symbol images Isp and the displayed symbol image Isc to present the fact to the user. Specifically, the symbol images do not include the image representing page images, to thereby indicate that the symbol images are not associated with any page image. By displaying the four non-corresponding symbol images Isn, the user can understand that four more page images can be displayed as pages available for switching with the tabs.

Figure 16B:
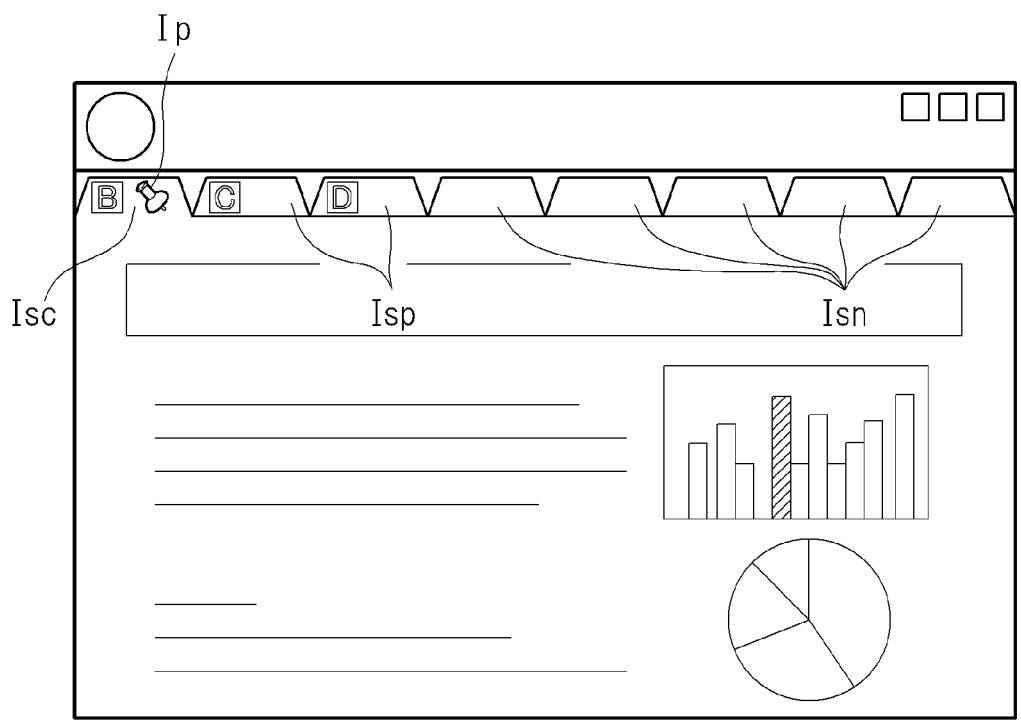
FIG. 16B is a diagram illustrating a result of performing the display termination operation on the screen of FIG. 16A.

Further, FIG. 16A illustrates how the user performs the slide operation in a predetermined direction (here, upward direction) with respect to the region in which the displayed symbol image Isc is displayed. The tab browser receives such slide operation in the predetermined direction as the display termination operation to terminate the display of the displayed page image. FIG. 16B illustrates a display example after the display termination operation is thus performed. In this example, as a result of terminating the display of the page image corresponding to the displayed symbol image Isc, the number of the non-corresponding symbol images Isn is increased by one, and the page image corresponding to the page-corresponding symbol image Isp that has been displayed next to the displayed symbol image Isc is newly displayed in the page image display region. Note that, here, the displayed symbol image Isc is set as the target of the display termination operation, but one of the other page-corresponding symbol images Isp may be set as a target for a similar display termination operation. In this case, the display in the page image display region does not change, but the page image corresponding to the page-corresponding symbol images Isp set as the operation target is excluded from the targets for tab switching.

Figure 17A:
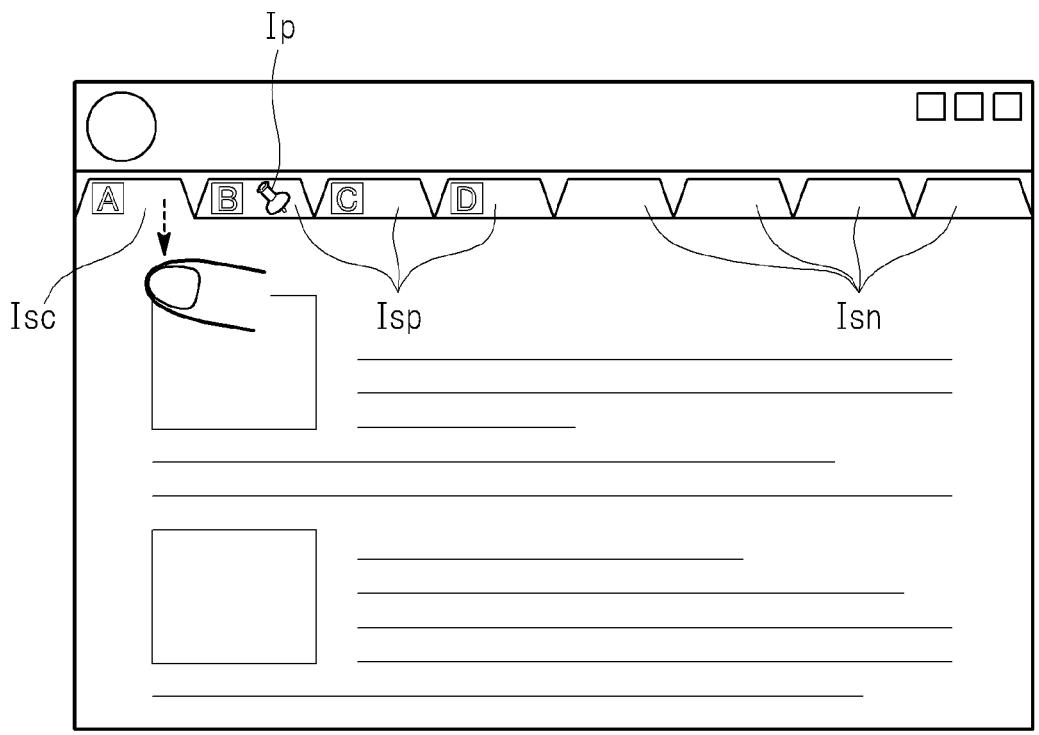
FIG. 17A is a diagram illustrating an example of a display screen of the tab browser.
Figure 17B:
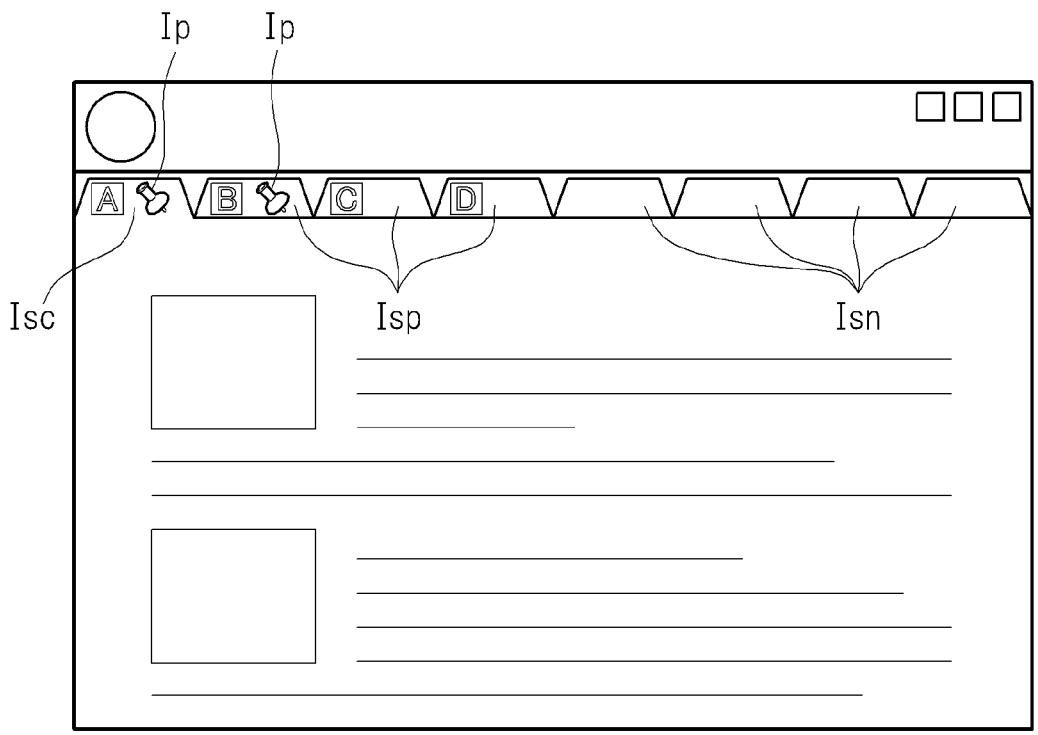
FIG. 17B is a diagram illustrating a result of performing a display termination restriction operation on the screen of FIG. 17A.

Further, FIG. 17A illustrates, in a display screen similar to that of FIG. 16A, how the slide operation is performed in a direction (here, downward direction) opposite to that of the display termination operation with respect to the region in which the displayed symbol image Isc is displayed. The tab browser receives the instruction operation in such direction that is different from the direction specified by the display termination operation as the display termination restriction operation to transition to the state in which the display termination of the displayed page image is restricted. FIG. 17B illustrates the state after the display termination restriction operation is performed, in which a pin image Ip indicating that the display termination of the page image corresponding to the symbol image is restricted is displayed in the displayed symbol image Isc. Note that, the display termination restriction operation may also be executed not only on the displayed symbol image Isc but also on one of the other page-corresponding symbol image Isp. Also in this example, each of the display termination operation and the display termination restriction operation on the symbol images is the slide operation in which the user moves his/her finger on the detection surface of the touch sensor provided so as to overlap the display screen. However, the present invention is not limited thereto, and the display termination operation and the display termination restriction operation may each be a drag operation of a mouse or the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing apparatus, comprising:
a display displaying a display target range, which is a part of a display region including display elements arranged therein,
wherein the display region comprises at least one unit region having a length in a scroll direction less than a length of the display target range and a second region having a length in the scroll direction longer than the length of the at least one unit region; and
a touch sensor for receiving a scroll instruction from a user, wherein the scroll instruction moves the display target range in the display region in accordance with a direction of the scroll instruction when the scroll instruction is received when the display target range is displayed on the display,
wherein, based on a position of the display target range in the display region, a movement amount of the display target range is changed in accordance with the scroll instruction,
wherein, when the display target range includes a portion of the at least one unit region after the movement by the movement amount in accordance with the scroll instruction, the display target range is moved to a position at which the entirety of the at least one unit region is included in the display target range, and
when the display target range only includes the second region after the movement by the movement amount in accordance with the scroll instruction, the display target range is moved by the movement amount in accordance with the scroll instruction, and,
when a new scroll instruction is received when the display target range only includes the second region, the display target range is only moved in a direction of the new scroll instruction.

2. The information processing apparatus according to claim 1, wherein the display target range is moved by the movement amount corresponding to the specified amount of the scroll instruction during the reception of the scroll instruction from the user, and the display target range is moved so as to include the at least one unit region entirely when a specified amount of the scroll instruction at a time point when completion of the scroll instruction is received is a specified amount by which the one unit region is included at a predetermined ratio or more with respect to the size of the display target range.

3. The information processing apparatus according to claim 2, wherein the display target range is returned to a position at which the one unit region is not included when the specified amount of the scroll instruction at the time point when the completion of the scroll instruction is received is a specified amount by which the one unit region is included at a ratio less than the predetermined ratio with respect to the size of the display target range.

4. The information processing apparatus according to claim 1,
wherein the display region includes a plurality of subregions, and
wherein, when the scroll instruction is a scroll instruction to include a border position of the plurality of subregions in the display target range, the display target range is moved by the movement amount that is determined based on a relationship between the border position and the position of the display target range in a case where the display target range is moved by the specified amount of the scroll instruction.

5. An information processing method, comprising:
displaying on a screen a display target range, which is a part of a display region including display elements arranged therein,
wherein the display region comprises at least one unit region having a length in a scroll direction less than a length of the display target range and a second region having a length in the scroll direction longer than the length of the at least one unit region; and
controlling a scroll to move the display target range in the display region in accordance with a direction of a scroll instruction when the scroll instruction is received from a user in a state in which the display target range is displayed,
wherein the controlling a scroll comprises changing, based on a position of the display target range in the display region, a movement amount of the display target range in accordance with the scroll instruction,
wherein, when the display target range includes a portion of the at least one unit region after the movement by the movement amount in accordance with the scroll instruction, the display target range is moved to a position at which the entirety of the at least one unit region is included in the display target range,
when the display target range only includes the second region after the movement by the movement amount in accordance with the scroll instruction, the display target range is moved by the movement amount in accordance with the scroll instruction, and,
when a new scroll instruction is received when the display target range only includes the second region, the display target range is only moved in a direction of the new scroll instruction.

6. A non-transitory computer-readable information storage medium having a program stored therein, the program causing a computer to function as:
a display displaying a display target range, which is a part of a display region including display elements arranged therein; and
a touch sensor for receiving a scroll instruction from a user, wherein the scroll instruction moves the display target range in the display region in accordance with a direction of the scroll instruction when the scroll instruction is received when the display target range is displayed on the display,
wherein, based on a position of the display target range in the display region, a movement amount of the display target range is changed in accordance with the scroll instruction,
wherein, when the display target range includes a portion of an at least one unit region after the movement by the movement amount in accordance with the scroll instruction, the display target range is moved to a position at which the entirety of the at least one unit region is included in the display target range, the at least one unit region having a length in a scroll direction less than a length of the display target range,
when the display target range only includes a second region after the movement by the movement amount in accordance with the scroll instruction, the display target range is moved by the movement amount in accordance with the scroll instruction, and, when a new scroll instruction is received when the display target range only includes the second region, the display target range is only moved in a direction of the new scroll instruction.

* * * * *